May 3, 1949.　　　　　P. MATWEEFF　　　　　2,469,200
HARNESS MOTION FOR LOOMS

Filed Sept. 11, 1946　　　　　　　　　　　　17 Sheets-Sheet 1

Fig.1

INVENTOR.
Paul Matweeff.
BY
Brown, Jackson, Boettcher & Dienner.
Attys.

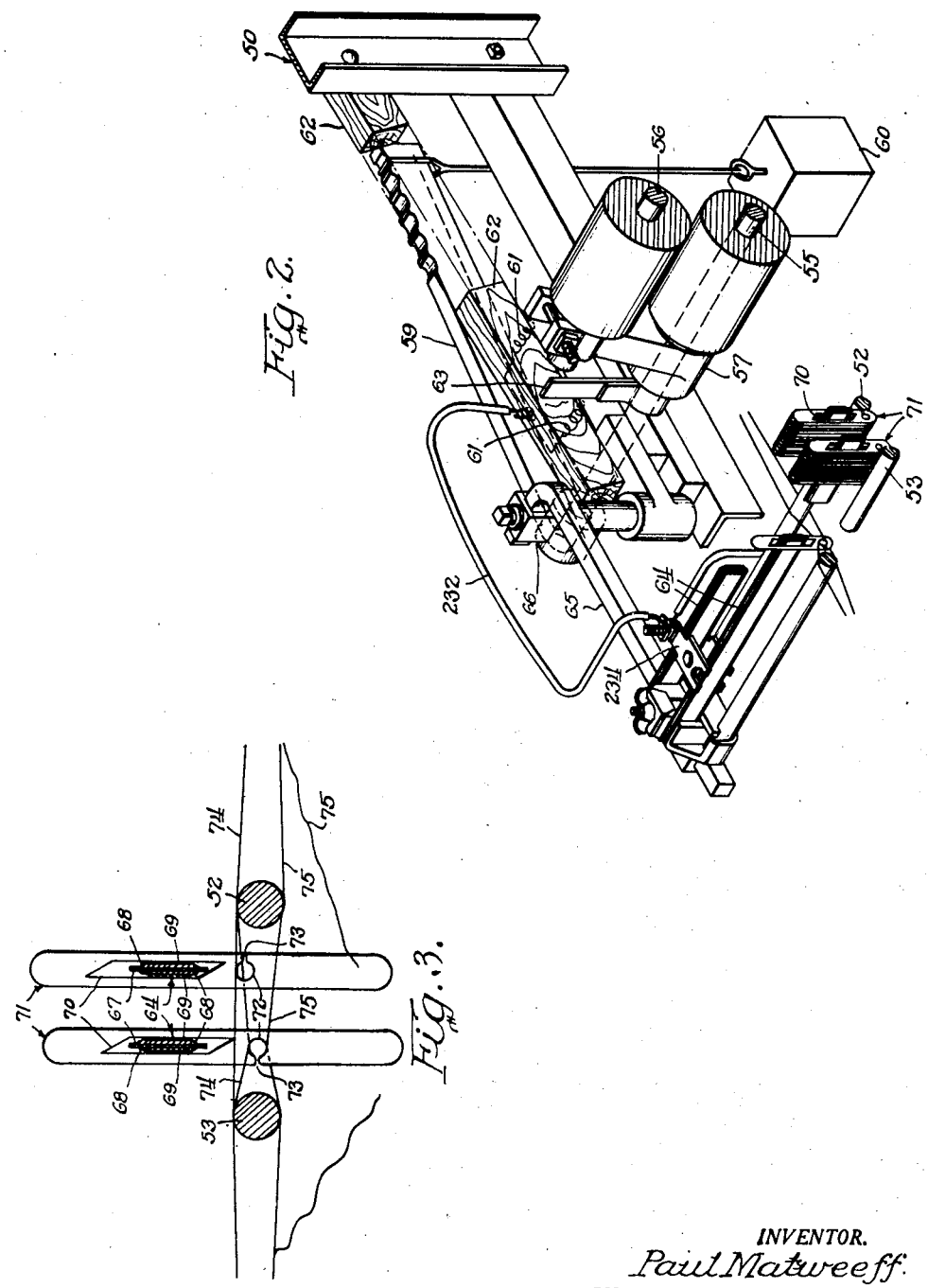

May 3, 1949.　　　　P. MATWEEFF　　　　2,469,200
HARNESS MOTION FOR LOOMS
Filed Sept. 11, 1946　　　　　　　　　　17 Sheets-Sheet 3
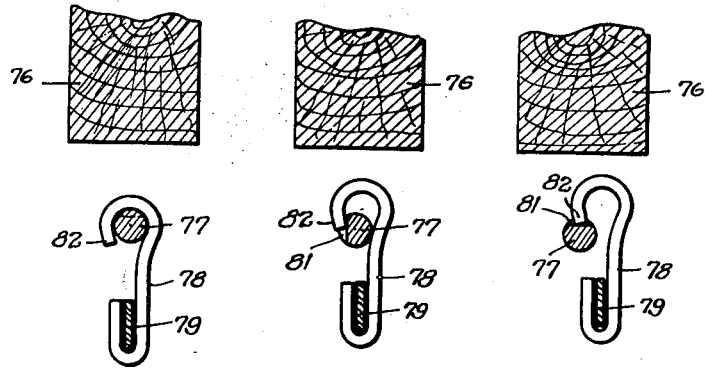
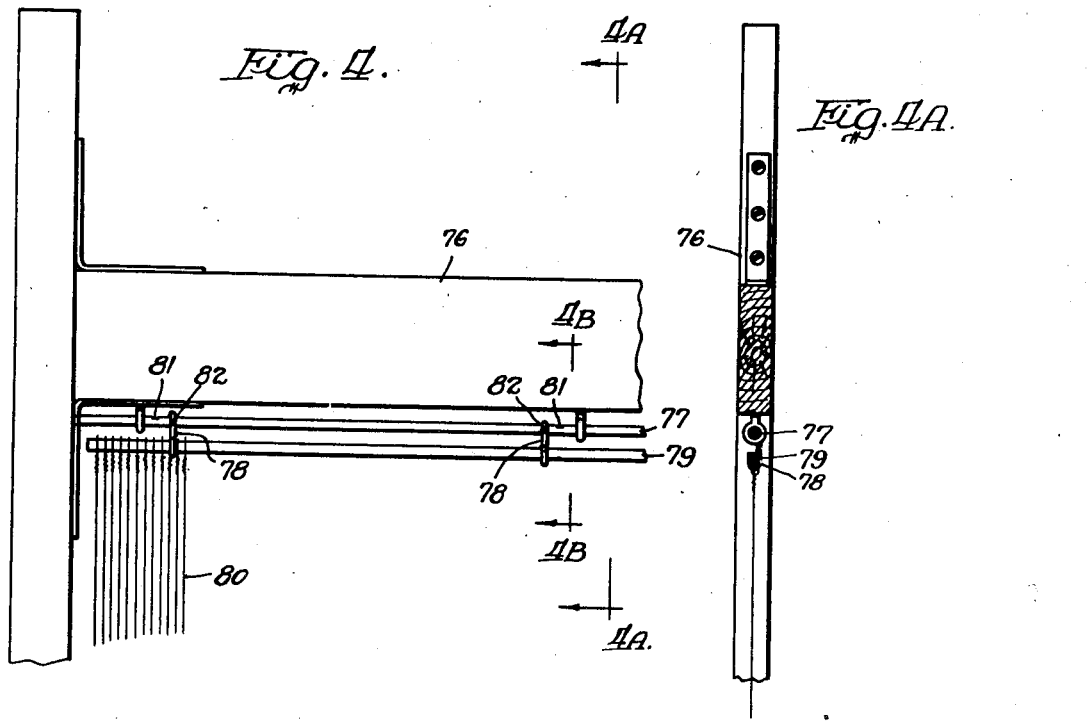
INVENTOR.
Paul Matweeff.
BY
Brown, Jackson, Boettcher & Dienner,
Attys.

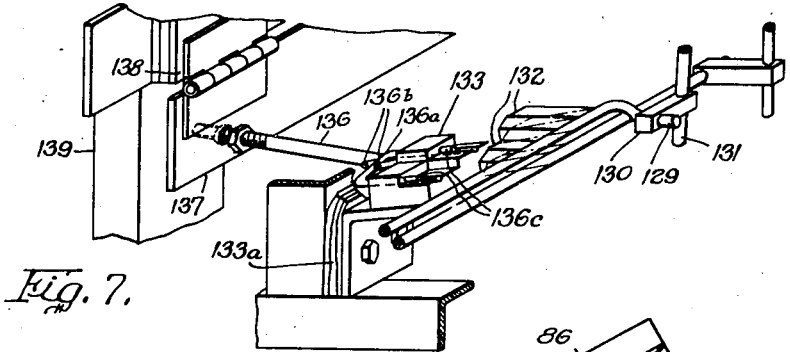
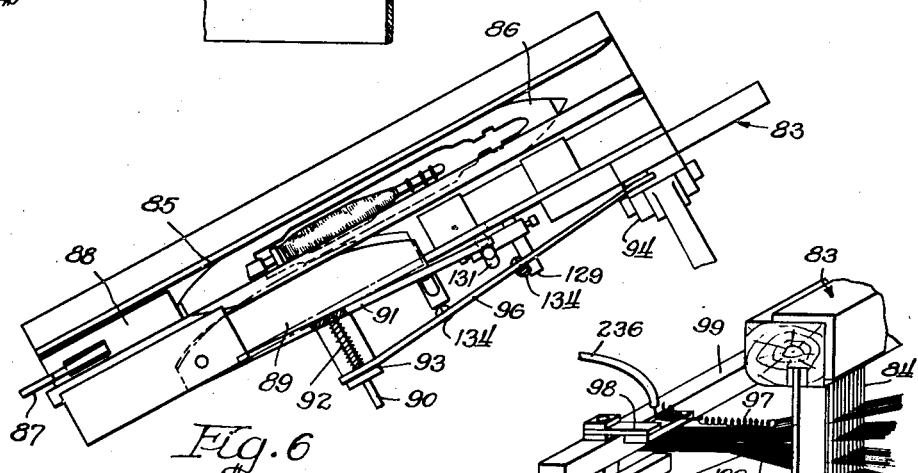
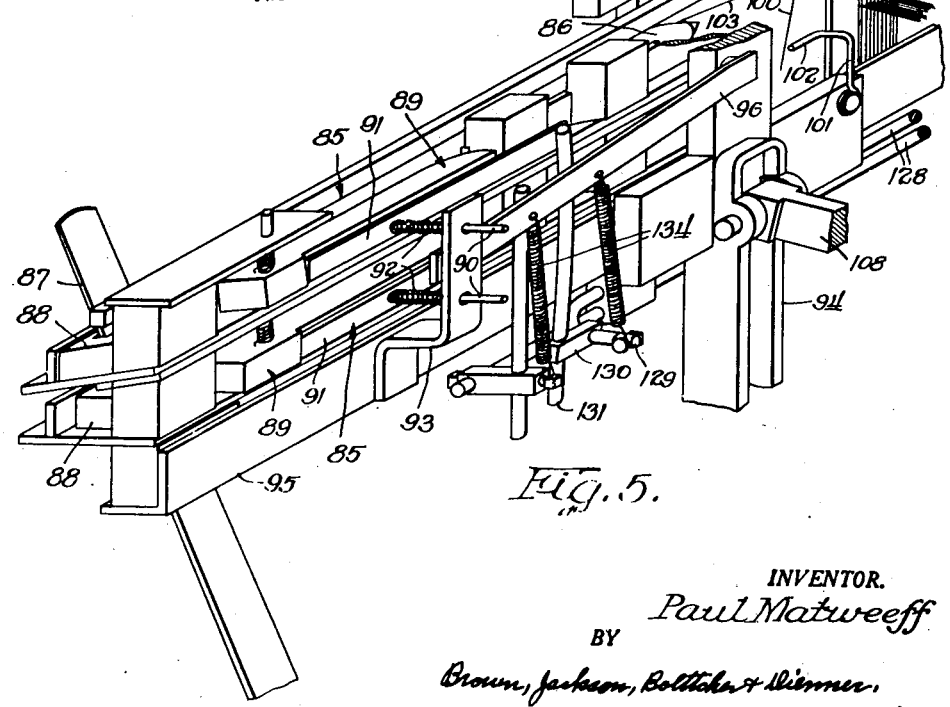

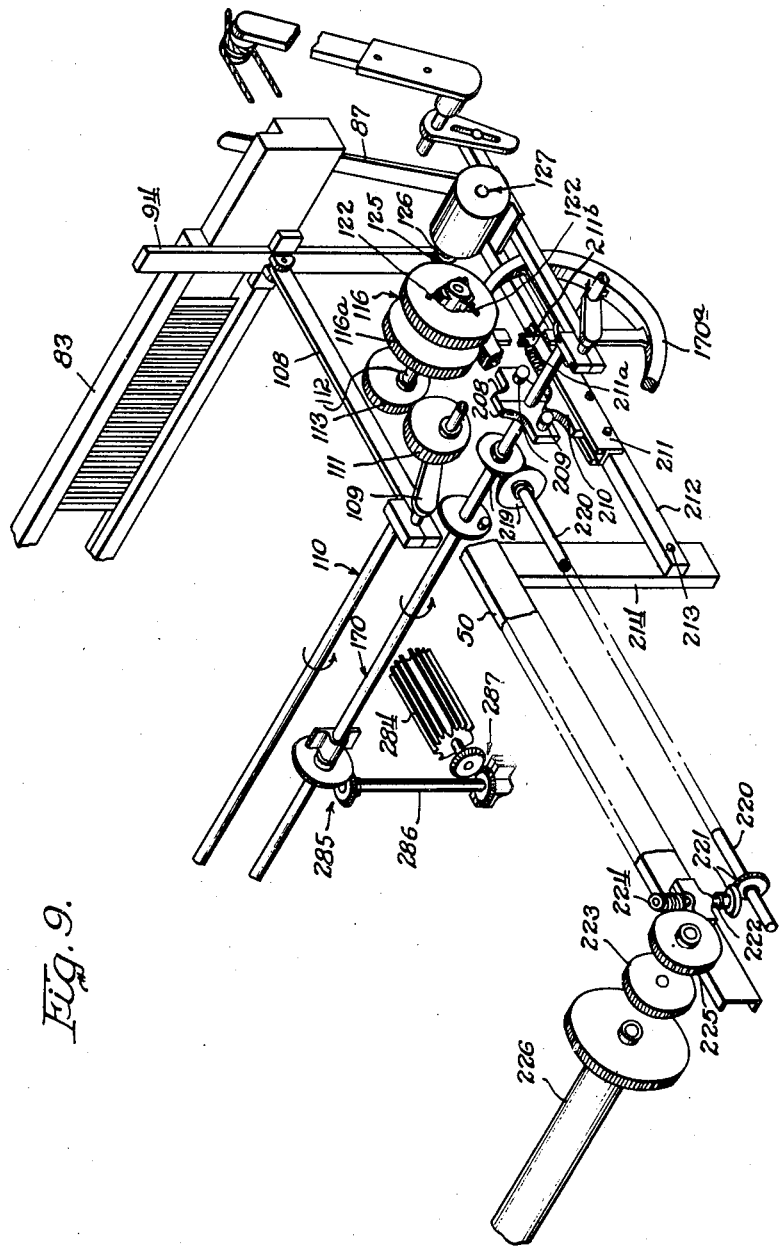

May 3, 1949.  P. MATWEEFF  2,469,200
HARNESS MOTION FOR LOOMS
Filed Sept. 11, 1946   17 Sheets-Sheet 7
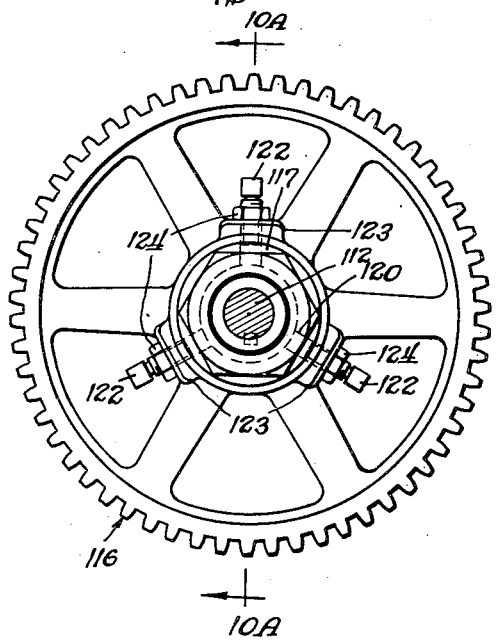
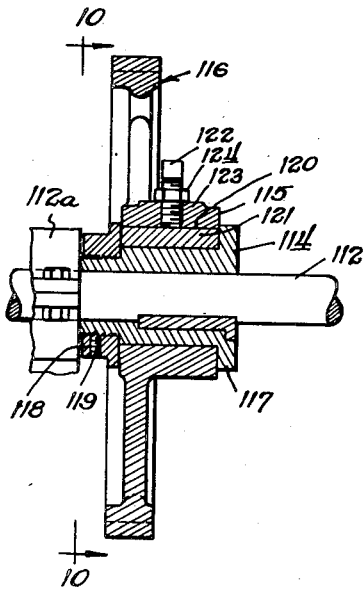
Inventor:
Paul Matweeff
By Brown, Jackson, Boettcher & Dienner,
Att'ys.

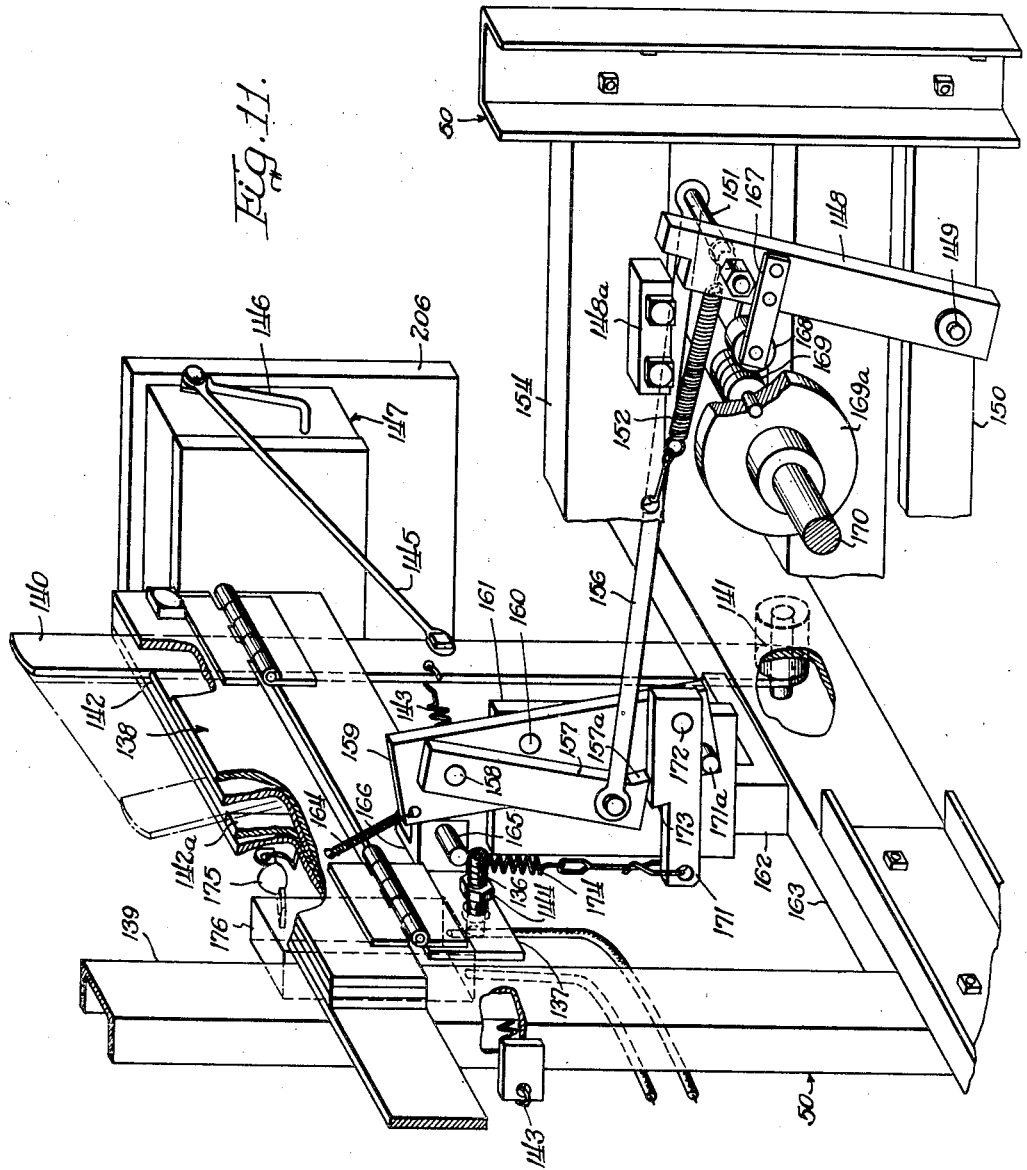

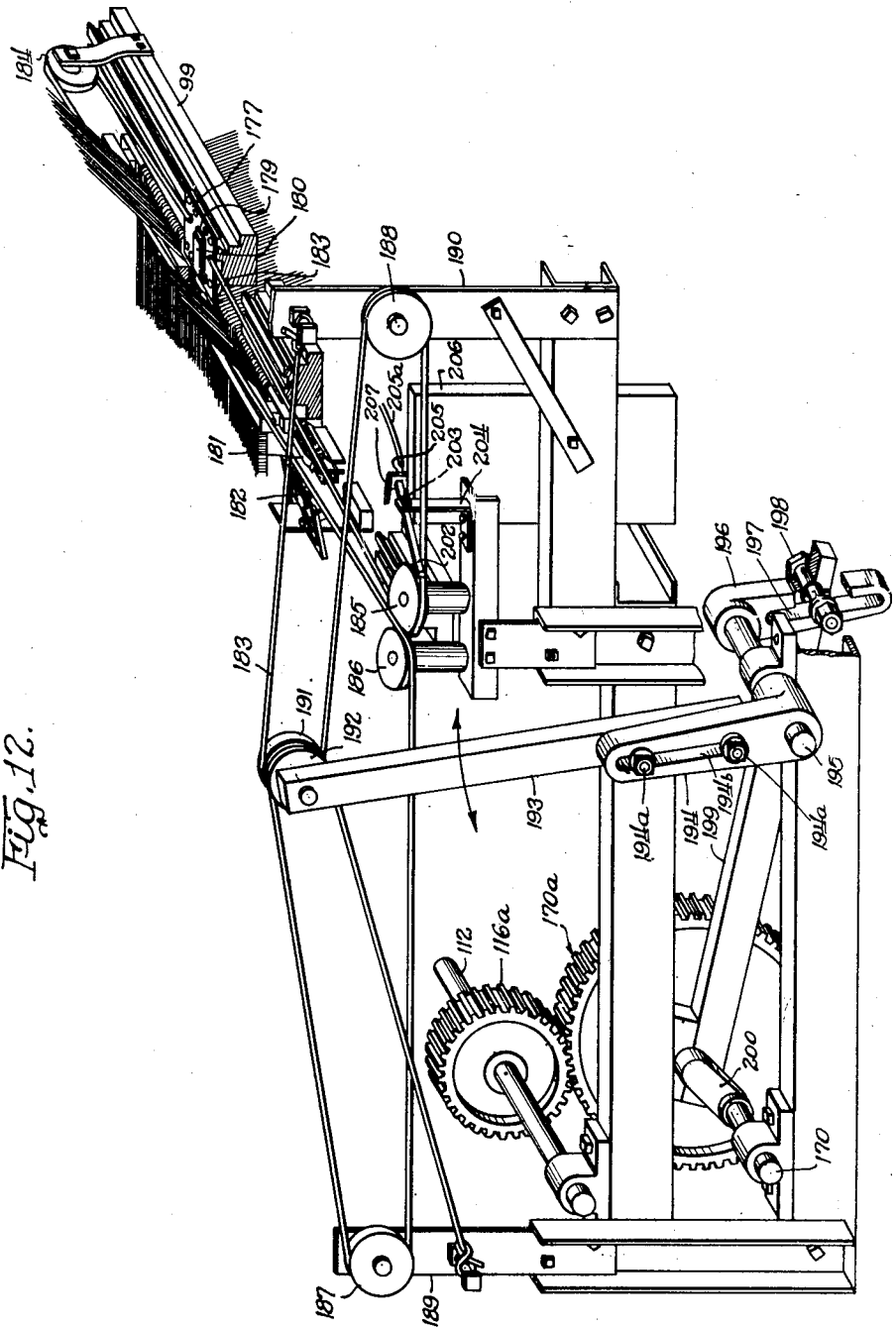

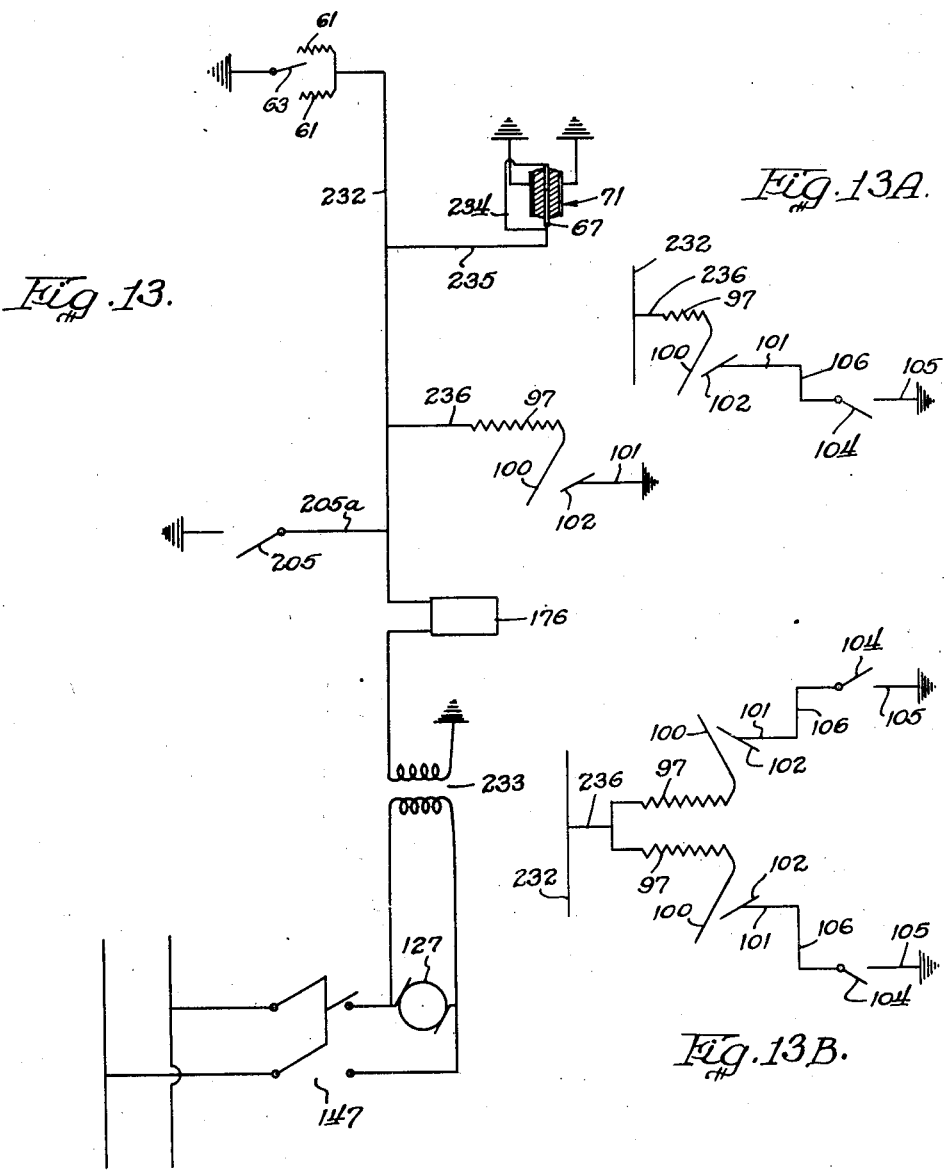

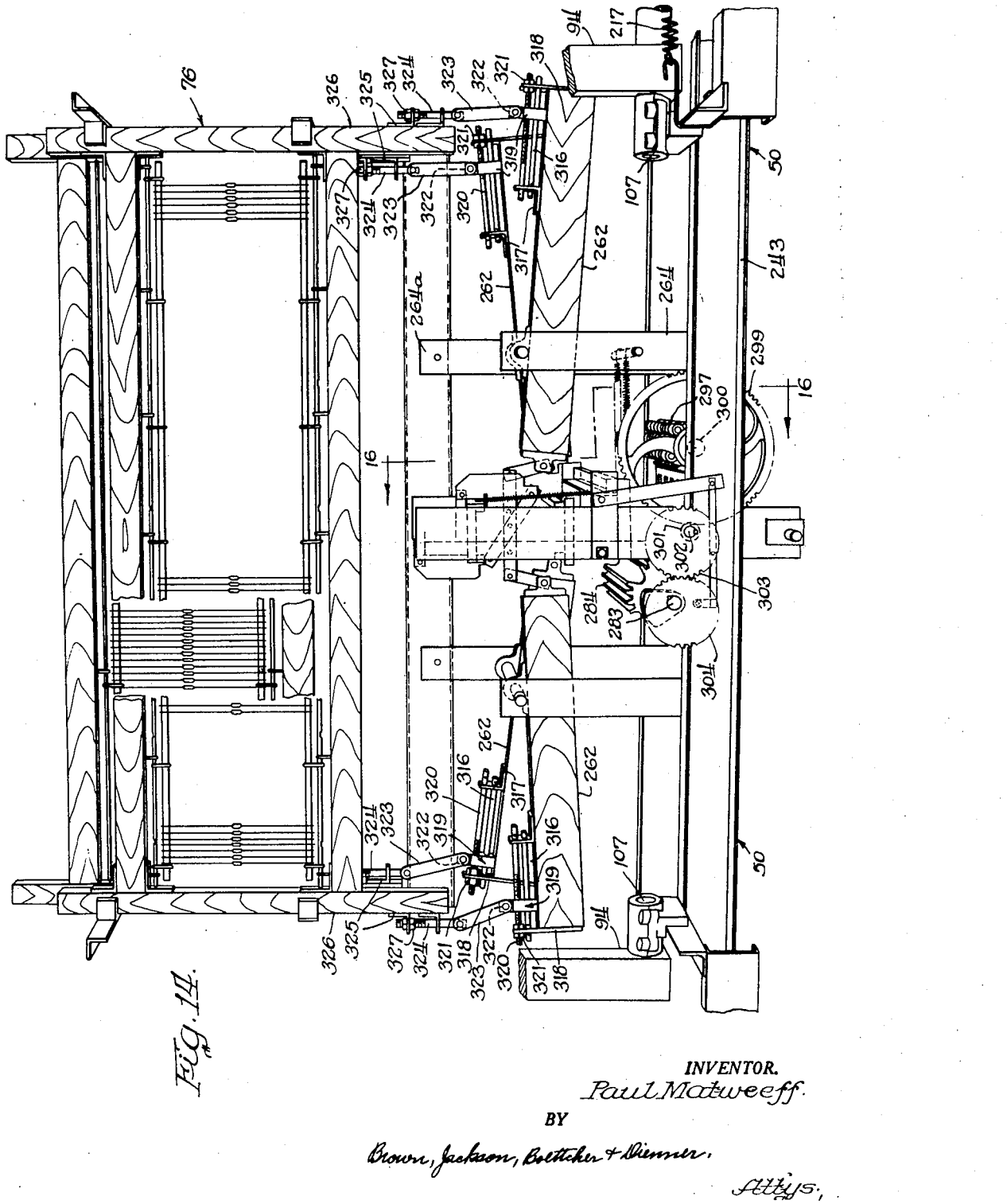

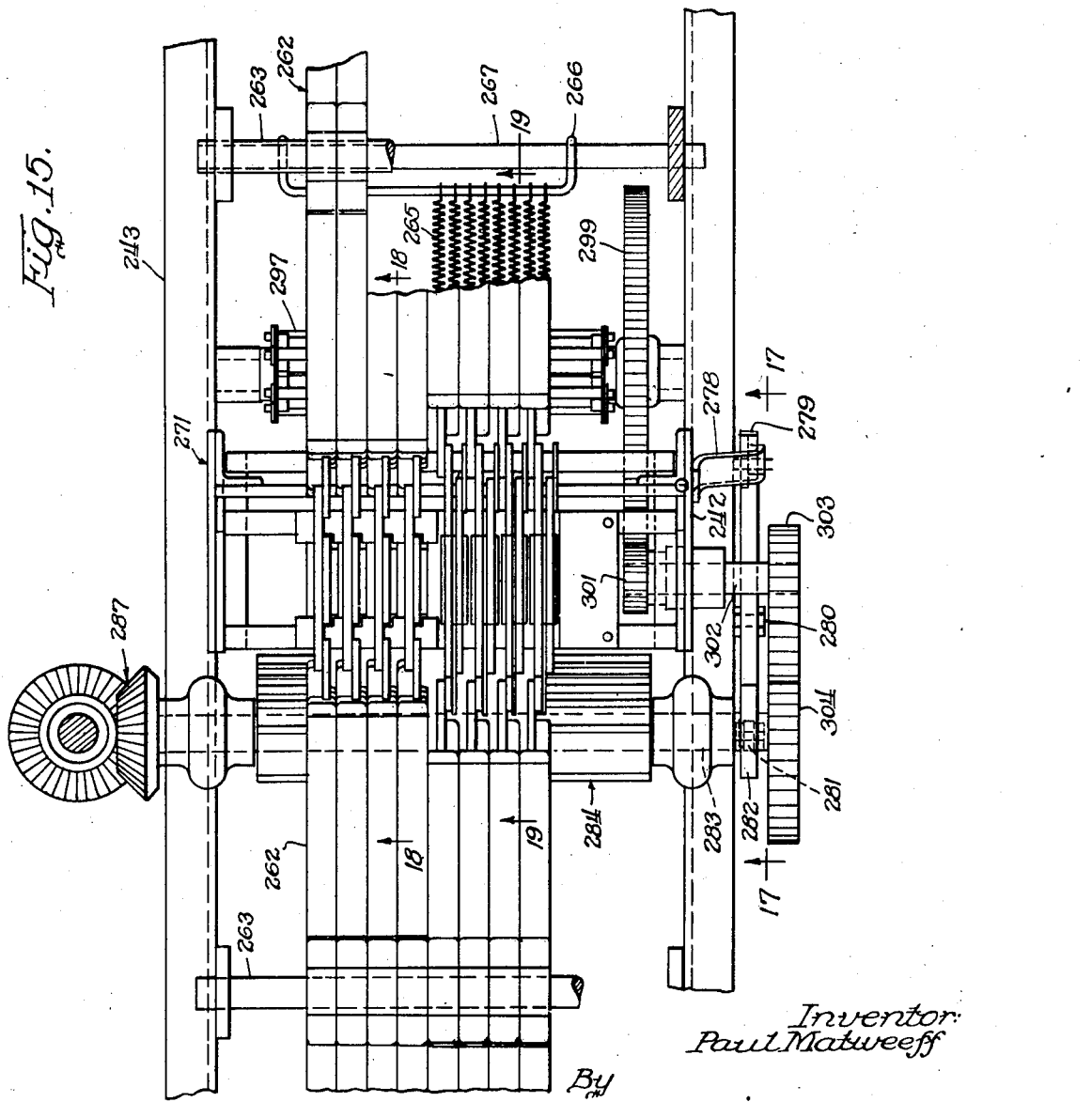

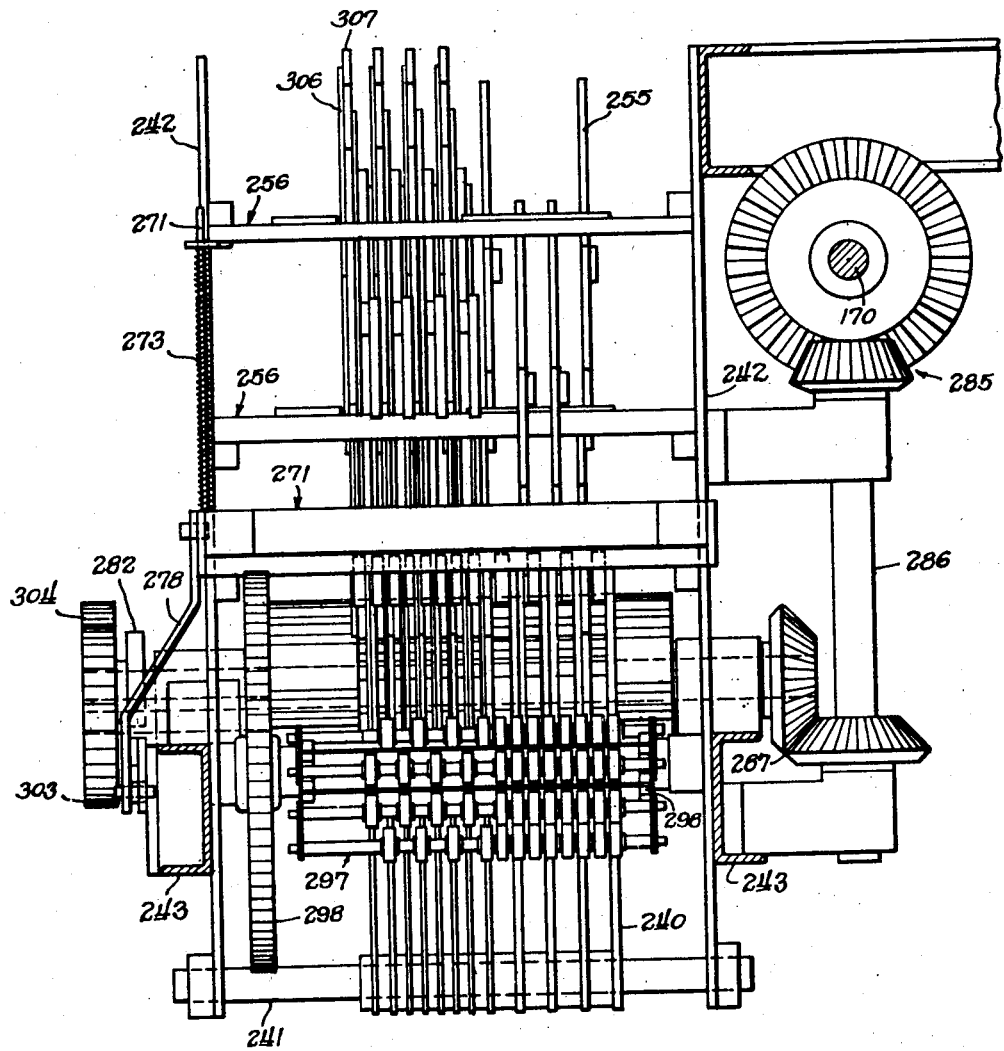

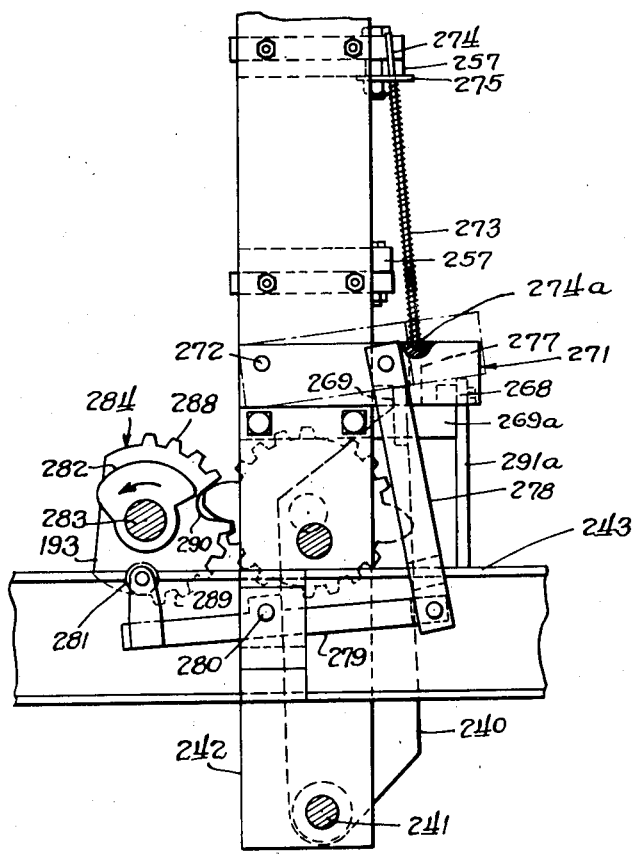

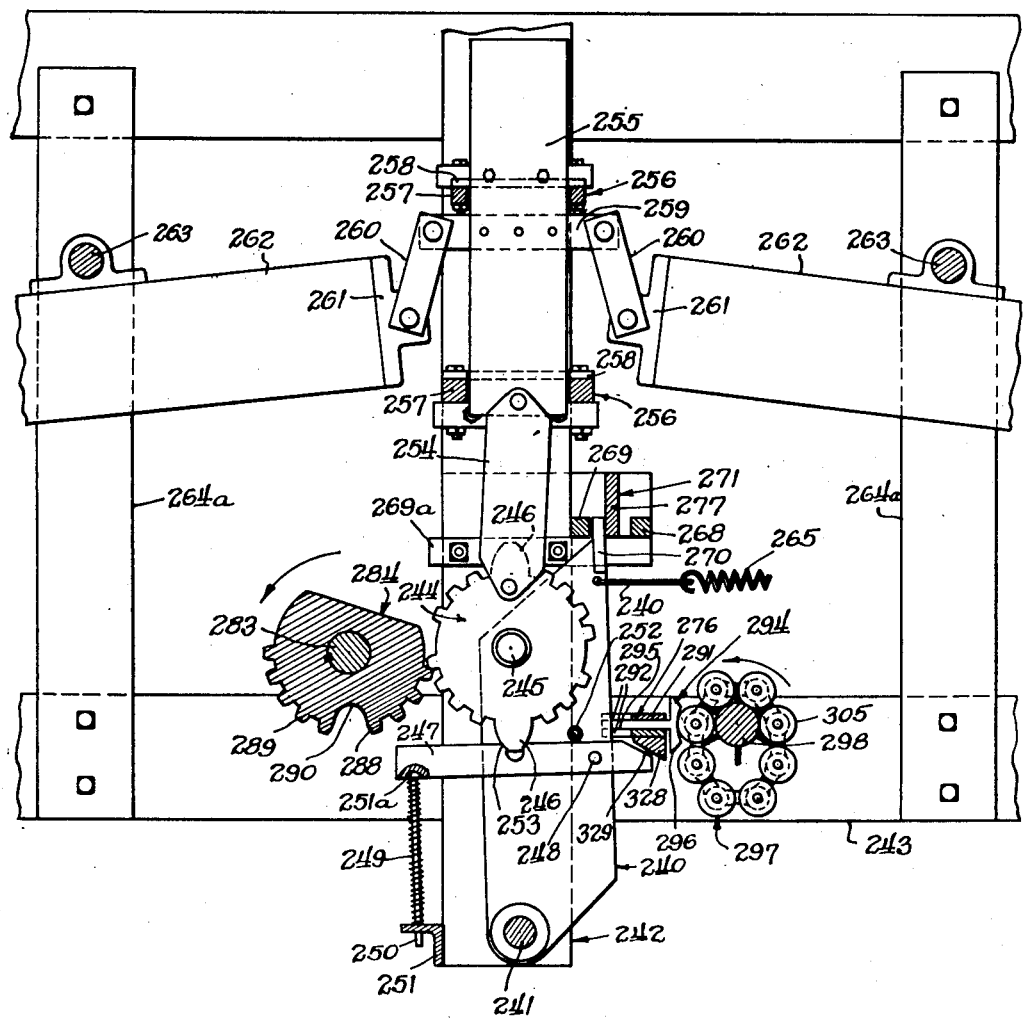

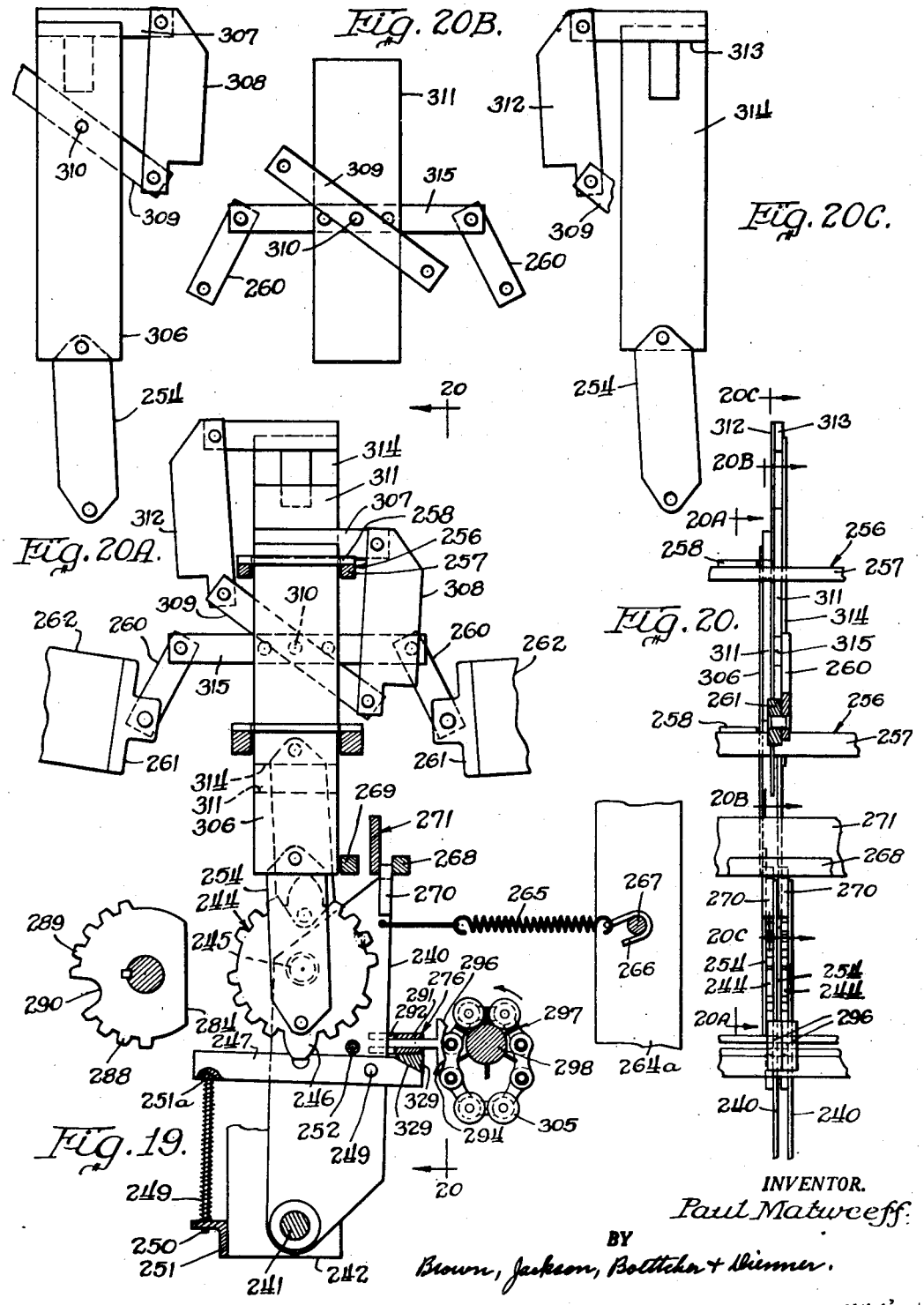

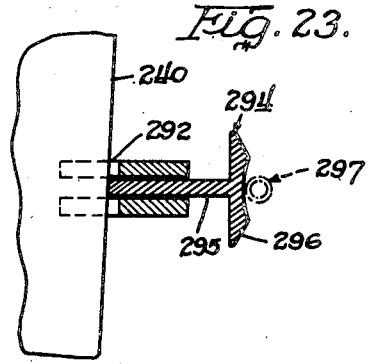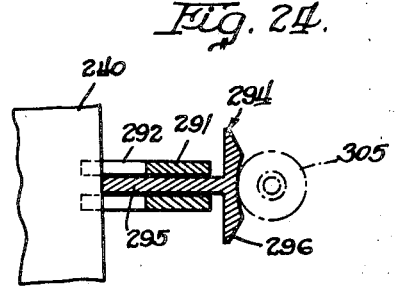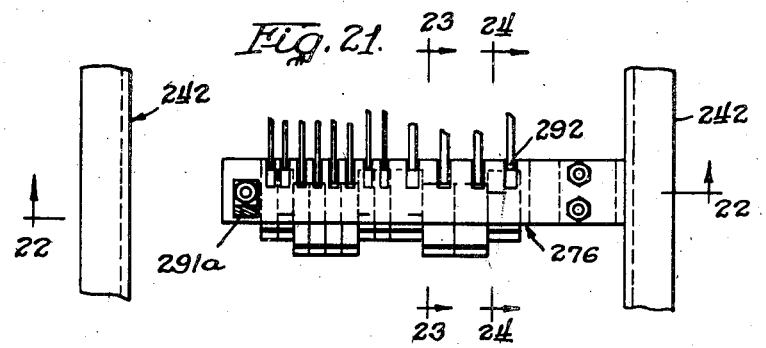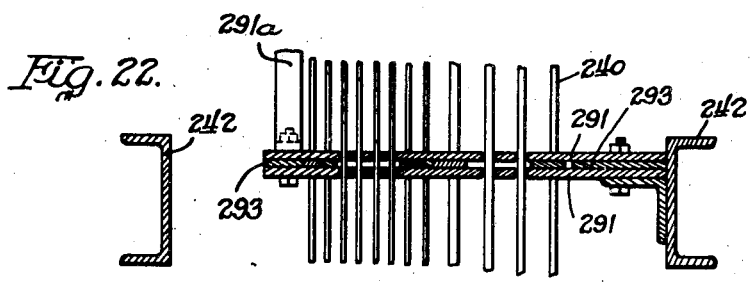

Patented May 3, 1949

2,469,200

UNITED STATES PATENT OFFICE 2,469,200

HARNESS MOTION FOR LOOMS

Paul Matweeff, Uncasville, Conn.

Application September 11, 1946, Serial No. 696,089

11 Claims. (Cl. 139—77)

This invention relates to looms, and has to do with power looms for weaving either plain or pile fabrics.

Weaving looms have been known and extensively used for many years. Though of rather numerous types in respect to details, they all involve the three fundamental motions of shedding, picking or filling, and beating up. In general, present day looms employ rather complicated harness motions, comprising an overhead control having rollers connected by straps to the harness frames, at the top thereof, and cam operated treadles connected by straps or ropes to jack bars loosely connected to the harness frames adjacent the bottom thereof. While there is considerable variation in present harness motions, they comprise, in general, numerous rollers, straps or ropes, and loose connections. The straps or ropes often stretch and neither accuracy nor smoothness in the operation of the harness frames is assured, so that defective shedding, and breakage of warp ends and harness connections often occurs, which is objectionable for obvious reasons. Also, in present day looms the lay motion is, in general, rather complicated and subject to excessive wear causing looseness between the parts and uneven movement of the lay, as well as frequent breakdowns and an excessively high percentage of idle time, and does not have sufficiently wide variation in its speed of operation per cycle to adapt it to various shedding conditions and requirements. In the known looms used for weaving pile fabrics, the slitter knife commonly is operated by a cord or gut attached thereto passing over guide rollers and anchored at its ends, in opposite relation, to a drum oscillated by a gear pinion meshing with a swinging gear segment. The cord or gut is thus subjected to sudden jerks in opposite directions, which cause frequent breakage of the cord, or pull it from the guide rollers so that it is drawn between the gear segment or rack and the pinion and is cut apart thereby. That is objectionable in necessitating stoppage of the loom until repairs have been effected, which may cause substantial loss to the loom operator due to the loom being idle, aside from the cost of repairing or replacing the slitter knife cord, which may be a minor consideration. Due to the various difficulties above referred to, modern plush looms have, on an average, an operating efficiency of from approximately 60% to 65% with respect to the time in operation of the loom, the necessity for frequent adjustments, replacement, or repair of various elements of the loom motions consuming the remaining 35% to 40% of the time. In other words, during a period of eight hours, which may be taken as an operating period for a loom, for example, approximately from two and one-half to three and one-quarter hours is lost in making necessary adjustments of the loom. That represents a serious loss to the weaver or loom operator, which loss in the use of present day plush looms is accepted as being unavoidable. Likewise, in present day looms used in weaving plain fabrics, serious loss in operating time is incurred in making frequent necessary adjustments.

My invention is directed to the provision of an improved loom of compartively simple construction and operation which avoids the above mentioned objections to the known looms above referred to, as well as certain other objections to such looms, as will appear more fully later. To that end, I have provided an improved harness motion whereby the harness frames are actuated positively and accurately, without objectionable looseness or play, and are locked in desired positions at the proper times during the filling and beating up operations. I also provide an improved lay motion whereby objectionable wear and looseness of parts are avoided, accuracy in operation of the lay is assured, wide variation in speed of the lay in each cycle thereof is provided, sufficient to render it readily adaptable to a wide variety of shedding conditions, and breakdowns with resultant idle time and loss are eliminated or greatly reduced. I further provide a slitter knife motion such that the slitter knife cord is not subjected to objectionable jerks such as might cause breakage thereof, and risk of the cord being displaced from its guide rollers or pulleys and cut by associated gearing is precluded. Additionally, I provide an improved overload friction connection between the motor and the main crank shaft and an improved protector motion which, together, effectively guard against breakage of gears or other damage when the loom bangs off. I provide also improved means for mounting the heddle bars whereby they may be removed from and replaced in the harness frames with expedition and facility, which is conducive to quick changing or replacing of the heddles, as may be required. I also provide protective motions for effecting quick stoppage of the loom upon occurrence of a condition which might adversely affect the weaving operation. A further important feature of my invention resides in the provision of an improved picker stick motion of simple construction and operation, which assures accuracy in the picker operation and is readily adjustable to operate either one shuttle or two shuttles, either criss-cross or in parallel and which greatly reduces breakage of the picker sticks. The use of a loom embodying the improvements of my invention, has demonstrated that, in weaving pile fabrics, it has an operating efficiency, with respect to time, of approximately from 85% to 90% and has a production capacity per hour of continuous operation at least equal to, on the average somewhat greater than, that of the best present day plush looms. It will be seen that the loom of my invention effects a saving of approximately from one to one and a quarter hours in operating time, during an eight hour period, with a corresponding substantial increase in production and resultant benefits to the weaver or loom operator. Further objects and advantages of my invention will appear from the detail description.

In the drawings:

Figure 1 is a perspective side view of a loom embodying my invention;

Figure 2 is a fragmentary isometric detail view, of the whip roll and the stop motion therefor and the warp stop motion and associated parts;

Figure 3 is a transverse vertical sectional view, on an enlarged scale, of the warp stop motion and associated parts;

Figure 4 is a fragmentary rear view of one of the harness frames showing a heddle bar and the supporting rod therefor and the connections therebetween;

Figure 4A is a sectional view taken substantially on line 4A—4A of Figure 4;

Figure 4B is a sectional view, on an enlarged scale taken substantially on line 4B—4B of Figure 4;

Figure 4C is a view similar to Figure 4B but showing one step in disengaging the heddle bar hook from the support rod;

Figure 4D is a view similar to Figure 4C but showing a succeeding step in disengaging the heddle bar hook from the support rod;

Figure 5 is a detail isometric rear view of one side portion of the lay and associated parts;

Figure 6 is a plan view, on a somewhat reduced scale, of the shuttle box and associated parts of Figure 5;

Figure 7 is a detail isometric view of the protector shafts and associated parts of the loom protector motion, at the left side of the loom, as viewed from in front;

Figure 8A:
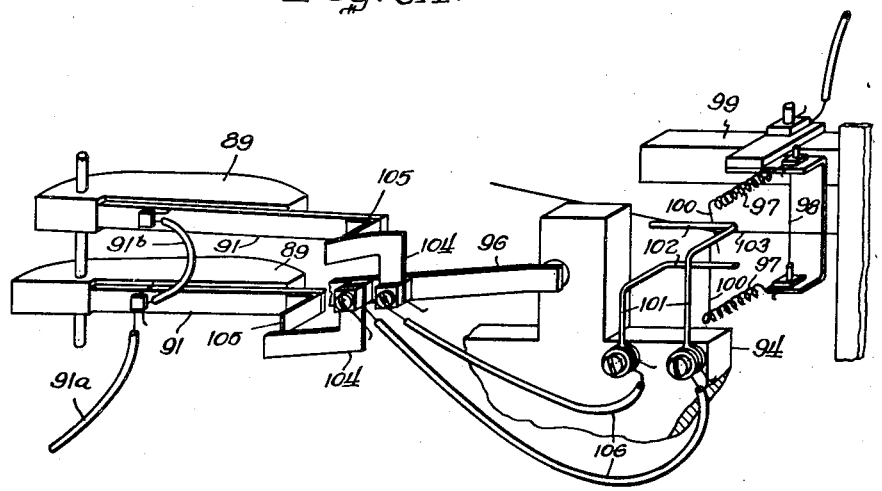
Figure 8A is a semi-diagrammatic isometric view of the two shuttle box binders and the contact members and associated parts at the right side of the loom, as viewed from in front, provided when two shuttles operated in parallel are used.

Figure 9 is a fragmentary semi-diagrammatic isometric view of the left side of the loom, as viewed from in front, showing the drive gearing arrangement, the slitting knife motion, the lay motion, the picker stick motion, the harness motion drive, the let off motion for one of the warp beams, and associated parts, certain parts being broken away and shown in section and certain other parts being omitted for clearness of illustration;

Figure 10 is an inner side view of the main drive gear showing the friction driving connection thereof to the primary drive shaft, taken substantially on line 10—10 of Fgure 10A;

Figure 10A is a sectional view taken substantially on line 10A—10A of Figure 10, certain parts being shown in elevation;

Figure 11 is an isometric view looking toward the left of the loom, as viewed from in front, of the knock off stop motion, certain parts being broken away and certain other parts being broken away and shown in section with other parts omitted for clearness of illustration;

Figure 12 is a fragmentary isometric outer side view of the forward portion of the left side of the loom, as viewed from in front, showing the slitting knife motion and associated parts, certain parts being broken away and certain other parts being broken away and shown in section with other parts omitted, for clearness of illustration;

Figure 13 is a circuit diagram of the electrical stop and control motions, showing the contact members of the filling stop motion provided when two shuttles operated criss-cross are used;

Figure 13A is a subdiagram showing the contact members of the filling stop motion provided when a single shuttle is used;

Figure 13B is a subdiagram showing the contact members of the filling stop motion provided when two shuttles operated in parallel are used;

Figure 14 is an isometric front view of the harness motion and the harness frames and associated parts, certain parts being broken away and shown in section, with the loom frame omitted in major portion and the lay and other parts in front of the harness frames also omitted, for clearness of illustration;

Figure 15 is a plan view of the harness motion and associated parts, with certain parts broken away and certain other parts shown in section;

Figure 16 is a sectional view, on an enlarged scale, taken substantially on line 16—16 of Figure 14, certain parts being shown in elevation and certain other parts being omitted for clearness of illustration.

Figure 17 is a sectional view taken substantially on line 17—17 of Figure 15, with certain parts omitted for clearness of illustration;

Figure 18 is a sectional view taken substantially on line 18—18 of Figure 15;

Figure 19 is a sectional view taken substantially on line 19—19 of Figure 15, with the parts shown in the positions which they occupy when the corresponding pile harness frame is in its intermediate position, certain parts being omitted for clearness of illustration;

Figure 20 is a side view of the pile harness frame motion mechanism of Figure 19, taken substantially on line 20—20 of Figure 19;

Figure 20A is a front view of the front plate of the mechanism of Figure 19, taken substantially on line 20A—20A of Figure 20;

Figure 20B is a front view of the middle plate of the mechanism of Figure 19, taken substantially on line 20B—20B of Figure 20;

Figure 20C is a front view of the back plate of the mechanism of Figure 19, taken substantially on line 20C—20C of Figure 20;

Figure 21 is a horizontal sectional view of the harness motion, taken in a plane a short distance above the guide comb showing in plan the vibrator plates and associated parts, with the plates broken away;

Figure 22 is a sectional view taken substantially on line 22—22 of Figure 21;

Figure 23 is a sectional view, on an enlarged scale, taken substantially on line 23—23 of Figure 21; and Figure 24 is a sectional view, on an enlarged scale, taken substantially on line 24—24 of Figure 21.

I have shown the loom of my invention, by way of example, as used for weaving pile fabric, such as plush, velvet and velour, to which it is particularly adapted in certain of its aspects. It is to be understood, however, that the loom of my invention is also well suited for weaving plain fabrics, such as cotton or other single thickness fabrics.

The loom of my invention is, in general, of known construction and operation and a brief description thereof, except as to those features having to do with my invention, which will be explained in detail, will suffice.

The loom comprises a suitable frame 50 at the back of which is rotatably mounted a slack warp beam 51 from which the warp ends are led, in a suitable manner, over and about an idle let off roll, a guide rod, lease rods, a driven let off roll, spreader bars 52 and 53 (Figure 3), and split rolls to the heddles of the harness frames, and thence through the reed of the lay to the fell of the woven fabric or cloth. The driven let off roll is driven by a continuously operating let off motion of known type, which is reversible to permit reversing the loom for unwinding the cloth for repair of defects, broken warp ends, and the like, or other purposes, as is known. A tight warp beam 54 is rotatably mounted on frame 50 adjacent and in front of slack warp beam 51. The warp ends from warp beam 54 are led over and about a tight warp idle let off roll, a tight warp driven let off roll, a whip roll shaft 55, a whip roll 56 rotatably mounted in cranks 57 fixed to shaft 55, the lease rods, the spreader bars 52 and 53, and the split rolls to the heddles of the harness frames and thence through the reed to the cloth. The tight warp driven let off roll is driven by a let off motion similar to that which drives the slack warp driven let off roll. A pile warp beam 58 is rotatably mounted on frame 50, in front of tight warp beam 54. The warp ends from warp beam 58 are led to and about an idle pile warp let off roll, a driven pile warp let off roll, and pile warp lease rods to the heddles and thence through the reed to the cloth. The pile warp driven let off roll is driven by a let off motion similar to those which drive the driven slack warp and tight warp let off rolls, and each warp beam is provided with known means frictionally resisting rotation thereof.

As is shown more clearly in Figures 1 and 2, an arm 59 is fixed to each end of whip roll shaft 55 and extends rearward therefrom. Each arm 59 carries a weight 60, adjustable thereon, which urges the whip roll 56 rearward. In the normal operation of the loom, the whip roll 56 swings forward during the forward stroke of the lay, in the beating up operation, and swings rearward on the back stroke of the lay, oscillating about the axis of its shaft 55. In the event of failure of the tight warp let off motion, the tight warp ends might be subjected to excessive tension in the forward stroke of the lay. In the event of maladjustment of the warp let off motion, the warp ends might become too slack, or too tight, and cause defects in the cloth. To guard against that, I provide two contact springs 61 (Figure 2) carried by an insulating support 62 mounted on the side of frame 50, one a suitable distance in front of, and the other a suitable distance in back of, a contact finger 63 secured to the whip roll shaft 55 and grounded thereby to frame 50. The springs 61 are connected by a common wire, insulated from the loom frame, to one side of a knock off electromagnet, to be referred to more fully later, the other side of which is grounded to the frame. If the whip roll swings and abnormal distance in either direction, finger 63 contacts one of the springs 61. That closes a circuit through the knock off electromagnet thereby actuating a knock off motion and stopping the loom before damage occurs, as will be explained more fully later. The contact springs 61 and finger 62 thus constitute one of the protective motions — the whip roll stop motion — of the loom.

As previously stated, the slack warp ends and the tight warp ends pass forward about spreader bars 52 and 53, certain of the warp ends passing above these bars and the other warp ends passing beneath them. In Figures 2 and 3, I have shown two composite bars 64, disposed between the spreader bars 52 and 53. The composite bars 64 are clamped to the forward ends of arms 65, one at each side of the loom frame 50, secured to bracket structures 66 fixed to and extending upward from the sides of frame 50. The object of providing two composite bars 64 is to avoid crowding of the warp ends, as will appear more clearly presently, and the number of composite bars and spreader bars may vary to suit conditions. I have shown but two spreader bars with a composite bar 64 between them, for clearness of illustration. The composite bar 64 comprises a central metal strip 67 separated by insulating strips 68 from front and back metal strips 69. The central strip 67 is of greater width than, and extends a substantial distance above and below, the insulating strips 68 and the front and back strips 69. Strip 67 is electrically connected, conveniently by a clamp 234 engaging its upper and lower edges, to the same wire to which the contact springs 61 are connected, as will appear more fully later. Since the bar 64 is clamped to arms 65, as above stated, the front and back metal strips 69 are grounded through arms 65 and bracket structures 66 to the loom frame 50.

Referring further to Figures 2 and 3, composite bar 64 passes through elongated vertical slots 70 in a plurality of contact leaves, one of which is shown at 71, formed of metal, preferably bronze. The slot 70 is in the form of a parallelogram with its ends inclined downward and rearward of bar 64, and is of a width to assure free vertical movement of leaf 71 about bar 64 while avoiding excessive clearances. The leaf 71 is also provided, a suitable distance below slot 70, with an opening or eye 72 of appreciable vertical extent from which a restricted slot 73 opens through one vertical edge of leaf 71. An upper warp end 74 and a lower warp end 75 are inserted through slot 73 into opening 72. These warp ends 74 and 75 should be of the same kind—either both tight warp ends or both slack warp ends. Since the warp ends 74 and 75 pass respectively over and under the spreader bars 52 and 53, which are of much greater diameter than opening 72, and are under tension, warp end 74 urges leaf 71 upward in opposition to warp end 75, which urges it downward. The net result is that leaf 71 normally floats about bar 64 in such position that the ends of slot 70 are maintained out of contact with strip 67. In the event warp end 74 breaks, however, leaf 71 is quickly pulled downward, by the tension of warp end 75 supplemented by gravity, first into contact, at the upper end of slot 70, with the upper edge of strip 67, and is then shifted rearward into contact with the front metal strip 69, of the composite bar 64. That closes a circuit through the knock off electromagnet and quickly stops the loom, as previously explained with reference to the whip roll stop motion. Likewise, if the lower warp end 75 breaks, the upper warp end quickly moves leaf 71 upward into contact with the lower edge of center strip 67 and with back strip 69, of composite bar 64, as shown at the right of Figure 3, quickly stopping the loom as before. It will be understood, of course, that the number of contact leaves 71 provided is adequate to accommodate all of the slack and tight warp ends, with each leaf receiving two thereof as above explained. I thus provide a simple and highly efficient warp stop motion effective for quickly stopping the loom responsive to breaking of either a slack warp end or a tight warp end.

It is desirable that removal and replacement of the heddles, as may be required, be effected with a minimum of delay. To that end, I provide each of the harness frames 76, adjacent the top and the bottom thereof, with a heddle bar supporting rod 77, suitably mounted in frame 76 transversely thereof, as is shown more clearly in Figures 4 to 4D, inclusive, and turnable therein for a purpose to be explained later. The rod 77 conveniently is of circular cross section, though it may be otherwise suitably formed within the broader aspects of my invention. Double wire hooks 78 engage about the rods 77 and heddle bars 79, on which latter the heddles 80 are mounted in the usual manner. The hooks 78 are freely slidable on rods 77 to facilitate proper positioning thereof and of the heddle bars 79 in frame 76. Each of the rods 77 is cut away to provide therein flat bottomed grooves 81 suitably spaced along rod 77 with certain thereof between adjacent hooks 78, in the normal positions of the latter on rod 77. The bill 82 of each hook 78 spaced away from the corresponding heddle bar 79 is curved conformably to rod 77 and the corresponding opening of such hook is of less width than the diameter of rod 77, so as to restrain hook 78 against disengagement from about rod 77. The grooves 81 are of such depth that, by sliding hook 78 along rod 77 into position with bill 82 thereof aligned with groove 81, and turning rod 77 so as to dispose groove 81 substantially vertically and opening toward bill 82, hook 78 may be moved transversely of rod 77, as permitted by the heddles 80, into substantially its position shown in Figure 4C. Then by turning rod 77 so that the flat bottom of groove 81 is substantially horizontal, the hook 78 may readily be disengaged from rod 77, as will be clear from Figure 4D. By reversing the process, the hooks 78 may be quickly and easily engaged about the rods 77. When all of the hooks 78 have been disengaged from both of the rods 77, the heddle bars 79 and the heddles 80 carried thereby may be removed as a unit from harness frame 76. From what has been said, it will be clear that the heddles may be removed and replaced, as may be required, with expedition and facility, and delay incident to changing the heddles is reduced to a minimum.

In the event of the filling thread or pick breaking, the loom should be stopped quickly and the broken thread or pick tied before continuing the weaving operation. To that end, I provide a filling stop motion of a character to effect quick stoppage of the loom. As above stated, I have shown the loom of my invention as used for weaving pile fabric, so that two shuttles are used, the shuttles being operated criss-cross, i. e., projected through the upper and lower sheds simultaneously and from opposite sides of the loom. The lay 83, of known construction, carries the reed 84 and, at each end, i. e., at each side of the loom, two superposed shuttle boxes 85, shown more clearly in Figure 5, for reception of shuttles 86 of suitable known type, one of which is shown in Figure 6. The picker sticks 87 pass upward through slots in the shuttle boxes 85 and through pickers 88, one in each shuttle box, for projecting the shuttles across the loom. Each shuttle box 85 is provided, at the rear thereof, with the usual swell or binder 89 pivoted at its outer end. The binder 89 normally is held in its forward or closed position by a rod 90 having a rounded head at its forward end seating in a corresponding socket in a thick metal strap 91 secured to the back of binder 89, and a coil compression spring 92 mounted on rod 90 and confined between the head thereof and a metal bracket 93, through which rod 90 slides, fixed to and extending upward from the shuttle box structure. The shuttle box structure is secured to the lay and to the adjacent lay sword 94, which is of metal, by metal parts 95 and 96, as is shown more clearly in Figure 5. The metal strap 91 is thus grounded to the loom frame, for a purpose to be explained later.

A contact spring 97 is mounted, by an electrical insulating support 98, on the slitter knife bench 99 and projects a short distance rearward therefrom. Spring 97 is provided, at its rearward end, with a depending contact finger 100 disposed adjacent one side—the right hand side—of the loom, outward beyond the ground warp area and an appropriate distance in rear of the fell of the cloth, as appears more clearly in Figure 5. A wire contact member 101, of substantially L-shape in plan, is bolted or otherwise secured to the lay sword 94, at the lower rail of lay 83 and outward beyond reed 84. Member 101 extends upward above the lower rail 95 of the lay 83, thence forward over that rail and then outward parallel thereto, with its forward arm 102 extending across the contact finger 100. When using two shuttles operated criss-cross, a pick thread or filler 103 normally will extend from the side of the warp into a shuttle box, in back of contact finger 100. Under such conditions, in the forward stroke of the lay 83, in the beating up operation, the contact finger 100 will be moved toward the fell of the cloth, by the filling 103 and will be held thereby out of contact with arm 102 of contact member 101. If the filling 103 breaks at the right hand side of the ground warp, arm 102 of member 101 will contact finger 100 on the forward stroke of lay 83. The contact spring 97 is connected by an insulated wire to one side of the knock-off electromagnet, as will appear more fully later, and contact member 101 is grounded to the loom frame through the lay sword 94. Accordingly, when arm 102 of member 101 contacts finger 100, the knock-off electromagnet is energized and the loom is quickly stopped. If the filling breaks at the left hand side of the ground warp, or during travel of the shuttle from that side, arm 102 of member 101 will contact finger 100 on the forward stroke of lay 83 immediately following return to the right side of the ground warp of the shuttle corresponding to the broken filler, and the loom will be stopped as before.

Figure 8:
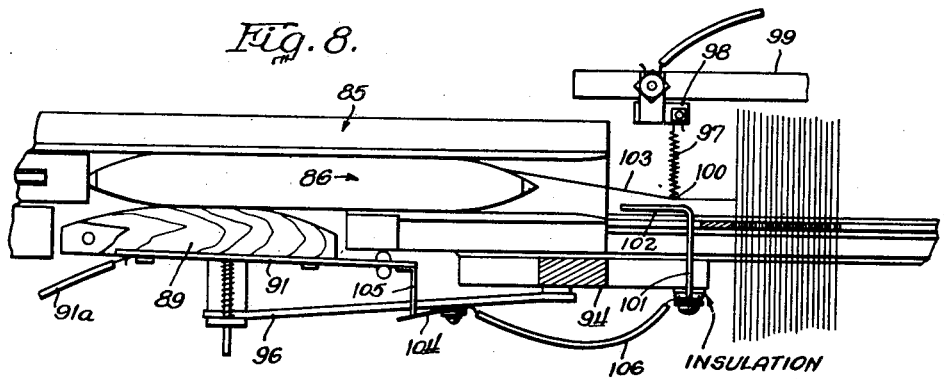
Figure 8 is a plan view of the shuttle box and associated parts at the right side of the loom, as viewed from in front, showing the contact members and associated parts of the filling stop motion provided when only one shuttle is used, as when weaving plain or cotton cloth.

When one shuttle is used, as in weaving plain or single thickness fabrics, I provide an additional pair of contact members 104 and 105 (Figure 8) adjacent the contact members 97 and 101, and electrically insulate the contact member 101 from the lay sword 94 and, therefore, from the loom frame. The contact member 104 is a yielding member, or spring, mounted on and electrically insulated from the shuttle box structure, and is connected to contact member 101 by an insulated lead 106. The contact member 105 is in the form of an angle finger directly secured to the inner end of metal strap 91 and grounded therethrough and through an insulated lead 91ª to the loom frame. Member 105 is disposed to contact member 104, when the binder 89 of shuttle box 85 is moved into its open or rearward position by the shuttle 86, as shown in Figure 8. When the shuttle 86 is not in the box 85, binder 89 is in its closed or forward position and member 105 is then held out of contact with member 104. From what has been said, it will be clear that the two sets or pairs of contact members are arranged in series. When the shuttle 86 is in its box at the right hand side of the loom, the contact members 104 and 105 are closed and, normally, a filler thread or pick extends from the right hand side of the ground warp. Under such conditions, on the forward stroke of the lay 83, in the beating up operation, the filler 103 holds finger 100 of contact spring 97 out of contact with arm 102 of contact member 101, and the filling stop motion does not come into play. But if the filling is broken and the shuttle is in the right hand box 85, finger 100 is contacted by arm 102 on the forward stroke of the lay 83. When that occurs, the knock-off electromagnet is energized and the loom is stopped. If the filling breaks at the left hand side of the loom or during travel of the shuttle from that side, arm 102 of member 101 will contact finger 100 of member 97, on the forward stroke of lay 83 immediately following entry of shuttle 86 into the right hand shuttle box 85, and the loom will be stopped as before.

When using two shuttles operated in parallel, under normal conditions two picks or fillings will extend from the opposite sides of the ground warp alternately. In order that the filling stop motion will operate when either filler breaks, I provide (Figure 8A) two sets of contact members, one set for each filling, and connect the straps 91 in series by a short lead 91ᵇ. Each set comprises two pairs of contact members 104 and 105 arranged and connected in the same manner as has been described with respect to the use of but one shuttle, and the two contact springs 97 of the two sets are connected to a common wire connected to the knock-off electromagnet. Since the functioning of the filling stop motion for two shuttles operated in parallel is the same, with respect to each filling, as that for a single shuttle, it is not thought necessary to describe it in greater detail here.

The lay 83 is carried by swords 94 (Figures 1, 5, 9 and 14) pivoted at their lower ends on stub shafts 107 rockably mounted at the sides of the loom frame 50 (Figure 14) and disposed as usual. The lay swords 94 are connected by rigid connecting rods 108, pivoted at their forward ends to swords 94, to cranks 109 of the main crank shaft 110 rotatably mounted on loom frame 50 in a suitable manner and extending there across a suitable distance in back of the swords 94. A gear 111 is keyed on the left hand end of crank shaft 110, as viewed from in front of the loom, in eccentric relation thereto, as shown in Figure 9. A counter shaft 112 is rotatably mounted at the left side of the loom frame 50 in a suitable manner, in front of and parallel with crank shaft 110. The counter shaft 112 is driven in a suitable manner, to be described presently. A gear 113 is keyed on counter shaft 112, eccentric thereto, and meshes with gear 111. The gears 111 and 113 are of the same diameter and are so disposed that the point on the periphery of gear 113 nearest its shaft coincides, or approximately so, with the point on the periphery of gear 111 most distant from its shaft, when the cranks 109 of shaft 110 are in their rearward position and the lay 83 is at the end of its back stroke. The eccentricity of the gears 111 and 113 relative to their respective shafts 110 and 112 is such that, when lay 83 reaches the end of its back stroke and starts on its forward stroke it is moving at greatly reduced speed. That produces, in effect, a pause in the movement of lay 83 of appreciable duration, ample for the shuttle to complete its travel through the shed, which remains fully open while the shuttle passes therethrough. Wide variation in the speed of operation of the lay in each cycle is provided by the eccentric gears 111 and 113, so that operation of the lay is readily adaptable to a great variety of shedding conditions and requirements. After the shuttle has completed its travel through the fully open shed, in the continued rotation of the eccentric gears 111 and 113 the effective radius of gear 113 increases while the effective radius of gear 111 decreases, so that the forward travel of lay 83 is accelerated, becoming maximum at the end of its forward stroke. The lay 83 then starts on its rearward stroke, during which its travel is decelerated, i. e., it is subjected to negative acceleration, upon completion of which it, in effect, pauses sufficiently to assure that the shed remains fully open during travel of the shuttle therethrough, as above noted, completing the cycle. I thus provide an improved lay motion of simple construction and operation, which assures high speed operation of the lay, provides wide variation in its speed of operation per cycle, whereby the lay operation is readily adaptable to a great variety of shedding conditions and requirements, eliminates objectionable wear and looseness of parts with resulting increased accuracy in operation, and assures that the shed remains fully open during passage of the shuttle therethrough.

A sleeve 114 (Figures 10 and 10A) is keyed on the outer end of counter shaft 112 and receives hub 115 of a gear 116. The inner end of sleeve 114 contacts a journal box 112ª secured to the loom frame 50, in which shaft 112 is journaled. The outer end of hub 115 contacts a circumferential shoulder 117 at the outer end of sleeve 114. A stop collar 118, threaded on the inner end portion of sleeve 114 and locked thereto by a set screw 119, contacts the inner end of hub 115 and in cooperation with shoulder 117 restrains hub 115, hence gear 116, against axial movement relative to sleeve 114.

Hub 115 of gear 116 is provided with three equally spaced inwardly opening lengthwise slots 120 of substantially rectangular cross section. Friction blocks 121 of suitable material, preferably brass, are mounted in slots 120 for movement radially of hub 115. Each of the blocks 121 has its inner face concaved to fit the curvature of sleeve 114, and has a flat outer face against which bears the flat inner end of a pressure screw 122 threaded through hub 115 and having an adjusting head at its outer end. Hub 115 is provided with bosses 123, through which the screws 122 pass, the radially outer ends of which are flat, providing seats for jam nuts 124 threaded on screws 122 for locking them in adjustment. Gear 116 is concentric with counter shaft 112, as will be clear from Figure 10, and meshes with a pinion 125 (Figure 9) keyed on armature shaft 126 of a reversible electric motor 127, of known type, which drives the loom. Suitable known means may be provided for reversing the brushes of the motor 127 so as to reverse its direction of rotation, or reversal of the motor may be effected by a reversing switch, or in any other suitable known manner.

The pressure screws 122 are so adjusted that the pressure contact of blocks 121 with sleeve 114 provides sufficient friction to assure that the loom will be driven by motor 127 under normal operating conditions, while providing for slippage in the event an abrupt and substantial increase in load occurs due to the loom banging off or other cause. Under such abnormal conditions, blocks 121 slip on sleeve 114 until the knock-off motion comes into play and stops the motor 127. The slippage means provided by the blocks 121 and associated parts may readily be adjusted to suit requirements, is simple and certain in operation, and provides assurance against breakage of gears or other serious damage to the loom when sudden and abnormal resistance to its operation is encountered.

Referring to Figures 5, 6 and 7, a protector shaft 128 is rockably mounted on the lay 83, at the underside thereof, and extends from side to side of the loom frame 50. As above explained, in weaving pile fabrics two shuttles are used and there are two shuttle boxes at each side of the loom, disposed in superposed relation and carried by the lay. When using two shuttles, as above, the lay is provided with two protector shafts. Since the operation of these shafts is the same, a description of one thereof and the parts cooperating therewith will suffice. The protector shaft is provided at each end thereof with a rearwardly extending arm 129 on which is fixed a block 130. A rod 131 is secured through block 130 and projects upward therefrom in the path of movement of the inner end portion of the metal strap 91 fixed to the rearward face of the shuttle box swell or binder 89. The protector shaft 128 is further provided with two forwardly extending protector fingers or daggers 132 disposed for cooperation with protector blocks or frogs 133 mounted on the sides of the loom frame with associated cushioning means 133a, in a known manner. The frogs 133 are of stepped construction, as shown in Figure 7. When the shuttle 86 is in its box 85, the binder 89 is in its open or rearward position, with metal strap 91 holding rod 131 rocked rearward, in opposition to a tension spring 134 connecting arm 129 of protector shaft to the metal strap 96, constituting part of the shuttle box structure, secured to bracket 93 and to lay sword 94. So long as the shuttle 86 is fully in its box 85, the binder 89 is displaced outward or rearward and holds the protector shaft 128 in such angular position that the daggers 132 thereof are raised sufficiently to clear the frogs 133. If the shuttle 86 is not fully in, or does not enter, its box 85, at either side of the loom, the binder 89 remains in its forward or closed position. Under such conditions, the protector shaft 128 is turned by the tension spring 134, as limited by contact of rods 131 with metal straps 91 of the respective binders 89, into such position that the daggers 132 are disposed to contact the shoulders of blocks 133 on the forward stroke of the lay in the beating up operation. When that occurs, the loom bangs off and is subjected to severe shock and is abruptly stopped. In order to guard against breakage of gears or other serious damage to the loom, when it bangs off, I provide a protector motion effective for quickly stopping the driving motor when banging off of the loom occurs.

As is shown more clearly in Figure 7, a trip rod 136 has its rearward end portion slidably supported by the frog 133 at the left hand side of the loom frame. The rearward end of rod 136 has operating connection to a member 136a slidable in frog 133 and disposed to be contacted by dagger 132 when the loom bangs off. Rod 136 extends at an inclination upward and forward from block 133 with its forward end extending through an opening in a plate 137 hinged at its upper edge to a guide bracket 138 fixed to an upright 139 rigid with the front of the loom frame adjacent the left hand side thereof. The bracket 138 defines an elongated opening or slot in which is reecived the upper portion of a control lever 140 (Figure 11) pivoted at its lower end, at 141, on the front of the loom frame for swinging movement about an axis extending fore and aft thereof. Conveniently, the control lever 140 is formed of strap steel and possesses appreciable inherent resiliency. When lever 140 is in starting position, it is disposed to the left of a stop strip 142 of the guide bracket structure 138, toward which stop strip the lever 140 is urged, by a tension spring 143 anchored thereto and to the upright 139.

When the loom bangs off, the dagger 132 at the left hand side of the loom frame strikes member 136a and forces trip rod 136 forward. This trip rod 136 is provided with an adjustable abutment 144 fixed thereon adjacent the rearward face of the hinged plate 137, the forward face of which is disposed in close proximity to the rearward face of control lever 140, when the latter is in its starting or operating position. Forward movement of trip rod 136 swings plate 137 forward thereby deflecting the control lever 140 in a forward direction, sufficiently to clear the stop strip 142. When that occurs, the control lever 140 is swung toward the left, as viewed in Figure 11, by tension spring 143, into its off position, such movement being limited by a stop element 142a of the guide bracket 138. Control lever 140 has operating connection, by a rod 145, to handle 146 of a switch 147, which controls the motor 127, which drives the loom. Accordingly when the loom bangs off, the motor circuit is opened and the loom is stopped immediately, before damage occurs. The switch 147 is shown, for purposes of illustration, as a known type of air break switch. In practice, however, an oil switch of suitable known type preferably is used, with appropriate connection to the control lever for starting and stopping the motor, such switch being reversible for reversing the operation of the loom when it is desired to unwind the cloth for repairing defects, or for other purposes, as is known.

The above description of the bang off protector applies, broadly, to the use of a single shuttle. When using two shuttles, for weaving pile fabrics, as in my loom herein disclosed, each of the frogs 133 is of stepped formation transversely as well as from front to back (Figure 7), to provide two steps or shoulders at different heights for cooperation with the daggers 132 of the two protector shafts 128, it being remembered that there are two of such shafts, which are disposed in superposed relation. In such case, that is, where two protector shafts are used, the rearward portion of the trip rod 136 is provided with two pins 136ᵇ fixed therein receiving between them the bight portion of member 136ᵃ, which is of substantially U-shape, as shown in Figure 7. That provides two fingers 136ᶜ at the rearward end of trip rod 136, one disposed to be struck by the dagger of one protector shaft and the other disposed to be struck by the dagger of the other protector shaft, when the loom bangs off. The operation of the bang off protector motion when using two shuttles is the same as described above and the description thereof need not be repeated here.

Reference has been made above to certain stop motions—the let off stop motion, the warp stop motion and the filling or pick stop motion—employing contact members for closing, under certain conditions, the circuit of the knock-off electromagnet. I provide, in conjunction with the knock-off electromagnet, a knock-off stop motion whereby the shipper lever is released and moved to its off position responsive to the closing of any one of the several protective electric circuits of the loom. Referring to Figure 11, a lever 148 is pivoted at its lower end, at 149, on a side frame member 150 on the loom frame 50. A stud 151 is secured to lever 148 and projects outward therefrom, this stud being connected by a tension spring 152 to frame member 154. Tension spring 152 urges lever 148 toward its forward position, with its upper end in contact with a stop block 148ᵃ fixed to frame member 154. A connecting rod 156 is pivoted at its rearward end on stud 151 and has its forward end pivoted to an arm 157, adjacent the lower end thereof, which arm is pivoted, at its upper portion, at 158, on a plate 159. This plate 159 is pivoted, adjacent its rearward edge and intermediate its ends, at 160, on a mounting plate 161 fixed to an angle bracket 162 which is fixed to frame member 163 at the front of the loom frame 50. The plate 159 has its upper end urged toward the hinged plate 137, by a tension spring 164 anchored to the upper forward corner of plate 159 and to the guide bracket 138. The spring 164 is rather light and the front edge of plate 159 normally is disposed in rear of a stud 165 carried by an angle bracket 166 fixed to the back of the hinged plate 137, the stud 165 extending across the plane of plate 159.

An arm 167, fixed on lever 148 and extending forward therefrom, carries a roller 168 disposed for contact by a camming roller 169 mounted eccentrically on a disc 169ᵃ fixed on a middle shaft 170 extending across, and suitably mounted for rotation on, loom frame 50, below the main crank shaft 110. Middle shaft 170 is driven at one-half the average or mean speed of crank shaft 110, by a gear 116ᵃ fixed on shaft 112 (Figure 9) and meshing with a gear 170ᵃ fixed on middle shaft 170 and having twice as many teeth as gear 116ᵃ, providing a 1:2 gear ratio. When the loom is in operation the crank shaft 110 is continuously driven, as is also the middle shaft 170 and, under normal conditions, the arm 157 (Figure 11) oscillates freely about its pivot 158 without affecting the position of plate 159. A latch member 171 is pivoted at its rearward end, at 172, on plate 159 adjacent the lower end thereof. The forward end portion of latch member 171 is of reduced width to provide an upwardly extending shoulder 173. A light tension spring 174 connects the forward end of latch member 171 to the rockably mounted armature 175 of a knock-off electromagnet 176, of known type, mounted on the guide bracket 138 for the shipper lever 140. Normally, the knock-off electromagnet 176 is de-energized and the armature 175 thereof is in its lowered position, latch member 171 being then also in its normal lowered position as limited by a stop pin 171ᵃ carried by plate 159.

When any one of the several sets of contact members of the electrical protective motion of the loom is closed, the knock-off electromagnet 176 is energized thereby raising its armature 175 and, through tension spring 174, lifting the outer or forward end of latch member 171. When that occurs, shoulder 173 of the latch member 171, which shoulder is slightly undercut as shown, is disposed for engagement by a corresponding tooth 157ᵃ at the lower rear corner of arm 157, on the rearward stroke of the latter. Upon engagement of arm 157 with latch member 171, the lower end of plate 159 is swung rearward and the upper end of this plate is swung forward into contact with stud 165, thus swinging the hinged plate 137 forward and releasing the control lever 140, which is swung to the left, as viewed in Figure 11, into its off position, opening switch 147 and stopping the loom as before. As will be understood, by undercutting shoulder 173 of latch member 171, and providing the complementary tooth 157ᵃ on arm 157, I guard against slippage and assure that these parts will remain in proper engagement during the rearward stroke thereof, for actuating plate 159 as and for the purpose stated. The knock-off electromagnet 176 is of known type, as stated, and is provided with means for establishing and maintaining its own local holding circuit, once it has been energized, so that it remains energized when the contact members of one of the protective circuits break contact and until the main switch 147 is opened, at which time the knock-off electromagnet 176 is de-energized and the armature 175 thereof returns by gravity to its normal lowered position.

As is known, and as above noted, in weaving pile fabric the upper and the lower cloths are connected by the pile warp interwoven therewith and extending therebetween, and are separated by cutting the pile by means of a slitting knife reciprocating along the knife bench 99 (Figure 12), above and below which the separated cloths pass, spaced an appropriate distance in front of the lay. I have provided an improved slitting knife motion, shown more clearly in Figures 9 and 12, whereby the knife is operated smoothly without subjecting the knife cord to objectionable jerks such as would tend to cause breaking thereof. A slitting knife plate or carriage 177 is mounted for reciprocation, in a known manner, on the knife bench 99. A slitting knife 179 is adjustably mounted on carriage 177 by means of a cooperating clamp 180, as is known. In its travel toward one side—the left side—of the loom, the knife 179 passes over and under sharpening stones 181 and 182, respectively, suitably mounted and disposed outward beyond the cloth in accordance with the usual practice, so that it is maintained in a sharp condition for cutting or slitting the pile. A knife operating cord 183 is passed through the carriage 177 and suitably anchored thereto. This cord 183 is passed about a grooved guide pulley 184 rotatably mounted on a substantially horizontal axis at one side—the right side—of the loom frame, from which the two runs of the cord pass to the left hand side of the loom frame above and substantially parallel with the knife bench 99. At the left side of the loom frame the cord 183 is led about two adjacent grooved guide pulleys 185 and 186 mounted for rotation about vertical axes. From the pulleys 185 and 186 the cord 183 passes about guide pulleys 187 and 188 mounted for rotation on horizontal axes, on uprights 189 and 190 slitably secured to the loom frame structure. From the pulleys 187 and 188 the cord 183 passes about guide pulleys 191 and 192 mounted for rotation about a common horizontal axis, at the upper end of a rocker arm 193, and thence to the uprights 189 and 190, to which the ends of cord 183 are anchored. The lower end portion of arm 193 is adjustably secured to an arm 194, conveniently by bolts 194a passing through a lengthwise slot 194b in arm 194.

The arm 194 is fixed on and extends upward from the outer or left end of a stub shaft 195 rockably mounted on the loom frame at the left hand side thereof in front of and parallel with the main crank shaft 110. An arm 196 is fixed on the other end of stub shaft 195 and extends downward therefrom. This arm 196 is provided with a lengthwise slot 197 receiving a shouldered pivot bolt 198 slidable therein and releasably secured thereto, for purposes of adjustment, in a known manner. A connecting rod 199 is pivoted, at its forward end, to arm 196 by bolt 198 and is pivotally connected at its rearward end, to a crank 200 of the middle shaft 170. This crank 200 is to the left of gear 170a keyed on middle shaft 170 which is driven at one-half the speed of shaft 112, as previously noted. It will be clear that in the rotation of the middle shaft 170 the rocker arm 193 is oscillated about the axis of stub shaft 195, the throw of this arm being adjusted by adjustment of the bolt 198 in slot 197 of arm 196. As will be clear from Figure 12, when the rocker arm 193 swings in clockwise direction, the cord 183 will be pulled about the pulley 184 so that the upper run thereof paralleling the knife bench 99 will travel toward the left side of the loom and the lower run will travel toward the right side of the loom, carrying with it the slitting knife 179. When the rocker arm is swung in counterclockwise direction, also as viewed from the left side of the loom, the upper run of the cord 183 will be moved toward the right side of the loom and the lower run will be moved toward the left side of the loom, carrying with it the slitting knife. Since the cord is maintained under tension about all of the pulleys, it is not subjected to objectionable jerks, such as would be apt to cause it to break, and the operation of the slitting knife is smooth, reducing likelihood of delay due to necessity for repairing or replacing the operating cord therefor. The middle shaft 170 operates at half the speed of the main crank shaft 110, as noted, and the slitting knife is moved across the loom and slits or cuts the pile after each picking or filling operation of the loom.

It is of importance that the loom be stopped promptly in the event of breaking of the slitter knife cord 183. To that end, I provide a slitter knife cord stop motion, shown more fully in Figures 9 and 13. A contact lever 202 is pivoted a short distance from its inner end, at 203, on a bracket 204 secured to the frame of the loom, at the left-hand side thereof. The outer arm of lever 202 normally rests upon a lower run of cord 183 extending between pulley 188 mounted on upright 190 and pulley 185. The cord 183 holds the outer arm of lever 202 raised, thereby holding the inner arm thereof depressed and out of contact with an angle contact finger 205 secured on an insulating panel 206 on which the switch 147 also is secured, suitably mounted on the loom frame. Finger 205 has at its upper end, a bill 207 overlying the inner arm of contact lever 202. This contact finger 205 is connected, by an insulated wire 205a, to the knock-off electromagnet 176. If the slitting knife cord 183 breaks, the outer arm of contact lever 202 drops bringing the inner arm thereof into contact with bill 207 of finger 205, thus closing a protective circuit through the knock-off electromagnet 176. That causes energization of the electromagnet 176 so that the loom is quickly stopped in the manner previously described. The contact lever 202 is, of course, grounded to the loom frame, as will be understood.

Referring to Figures 1, 9 and 14, the middle shaft 170 extends the full width of the loom and is driven at one-half the speed of the main crank shaft 110, as previously noted. Two split blocks 208 are clamped on shaft 170 adjacent each side of the loom frame 50, and each block 208 has suitably mounted thereon a pair of picker balls 209. The picker balls 209 are disposed to contact a picker cam 210 slidably mounted in a guide frame 211 bolted to a picker lever 212 pivoted at its rearward end, at 213, on a member 214 of the loom frame. The forward end portions of the picker levers 212 overlie the inner arms 215 of angle brackets or castings 216 (Figure 1) pivoted at 216a on arms 107a rigid with and extending upward from stub shafts 107. The lower end portions of the picker sticks 87 are suitably secured in the outer arms of the angle brackets 215, as will be understood. Tension springs 217, anchored to downwardly extending fingers 218 of the angle brackets or fittings 216 and to the sides of the loom frame 50 (Figures 1 and 14), normally hold the picker sticks 87 in their outer positions away from the sides of the loom frame, as is known. The picker cams 210 are urged forward in their respective guide frames 211, by tension springs 211a anchored thereto and to angle brackets 211b secured to the picker levers 212, the forward end of frame 211 being closed to provide a stop limiting relative forward movement of the picker cam 210. During normal operation of the loom, the middle shaft 170 is rotated in clockwise direction, as viewed in Figure 1, and in counterclockwise direction, as viewed in Figure 9. In such rotation of shaft 170, the picker balls 209 strike the picker noses or cams 210 and, in cooperation with tension springs 211a, actuate the picker sticks 87 for performing the picking or filling operation in a manner well understood in the art.

Since the middle shaft 170 is rotated at one-half the speed of the main crank shaft 110; when the loom is used for weaving pile fabric and the two shuttles are operated crisscross four picker balls 209 are mounted on the middle shaft 170, two at each side of the loom, with the balls of each pair disposed at diametrically opposite sides of middle shaft 170 and in the same angular relation to that shaft as the balls of the other pair, as will be understood. When the loom is used for weaving plain cloth or fabric, with a single shuttle, but two picker balls 209 are mounted on the middle shaft 170, one at each side of the loom, these balls being disposed 180 degrees apart, that is, at diametrically opposite sides of the middle shaft 170. Likewise, in using the loom for weaving pile fabric and with the two shuttles operated in parallel, but two picker balls 209 are mounted on the middle shaft 170 in the same manner as for weaving plain fabric with the use of but one shuttle. By having the picker noses or cams 210 slidable in the guide members or frames 211, the loom may be reversed without operating the picker sticks, for unwinding the cloth for repairing defects, or for other purposes.

The middle shaft 170 has driving connection, through bevel gearing 219 (Figure 9), to a shaft 220 extending rearward of the loom frame, this shaft 220 having driving connection, through bevel gearing 221, to a vertical stub shaft 222. This shaft 222 drives a timing gear train 223, including change gears, as is known, through a worm 224 secured on shaft 222 and meshing with a worm wheel 225 of the gear train. The gear train drives a let-off roll 226 of the let-off motion of the pile warp, this roll 226 being provided with an abrasive coating, such as emery, for gripping the pile warp ends passing thereabout, as is known. Each of the driven let-off rolls of each of the warps is driven from shaft 220 through a let-off motion, in the same manner as roll 226. As will be seen, the let-off motion for the respective driven let-off rolls for the warps is continuous in operation and will be reversed when the operation of the loom is reversed.

The main crank shaft 110 has driven connection, at its right-hand end, as viewed from in front of the loom, through bevel gearing 227 (Figure 1), to the upper end of an inclined shaft 228. A worm 229 is keyed on the lower end of shaft 228 and meshes with a worm wheel 230 driving a gear train 231, including change gears which drive the take-up or pin rolls by means of which the upper and lower cloths are taken up or drawn forwardly through the loom, as formed. As previously explained, the slitting knife cuts the pile between the cloths, the upper one of which is led forwardly over the knife bench, with the lower one being led forwardly under the knife bench. The two cloths are wound onto roll-up rolls at the front of the loom driven in a known manner from one of the take-up rolls, with provision for slippage to accommodate increase in diameter of the rolls of cloth wound onto the roll-up rolls, as is known.

In Figures 13, 13A and 13B I have shown the diagram of the various protective electrical circuits. The two whip roll contact springs 61 are connected to a common lead or wire 232 which is connected to one side of the knock-off electromagnet 176. The other side of the electromagnet 176 is connected to the secondary of a transformer 233, mounted on the panel 206 (Figures 11 and 12), the primary of which transformer is connected in shunt with the motor 127 to the power line, the connection for the primary of transformer 233 being between the motor switch 147 and motor 127. The secondary of the transformer 233 is grounded to the frame of the loom as indicated. A suitable metal clamp 234 engages the upper and lower edges of the central metal strip 67 of the composite bar 64. As previously explained, when two or more composite bars are used, the clamp 234 bridges the bars in contact with the upper and lower edges of the central metal strips 67 thereof. Clamp 234 is connected to wire 232, either directly or by an insulated lead 235. The contact spring 97 on the knife bench is connected by an insulated lead 236 to wire 232 and the contact finger 205 of the knife rope stop motion is connected by an insulated lead 205a to wire 232. As will be clear from the diagram of Figure 13, when any one of the protective electrical circuits of the loom is closed, the knock-off electromagnet 176 is energized and the loom is immediately stopped, as and for the reasons above explained. When the loom is used for weaving plain fabric or cloth, with a single shuttle, the lay contact member 101 is electrically insulated from the loom frame and is connected by an insulated lead 106 to the contact spring 104 mounted on the shuttle box structure and also insulated from the loom frame, so that the contact members 97, 101, 104 and 105 are connected in series, as indicated in Figure 13A, the contact spring 97 being connected by lead 236 to wire 232, as before. From the diagram of Figure 13 and the diagram of Figure 13A, it will be clear that when the shuttle is in its box at the right hand side of the loom and the filling or pick breaks, the loom will be stopped in the manner previously described. Likewise, if the filling or pick breaks at the left hand side of the loom, or during travel of the shuttle from that side, the loom will be stopped when the shuttle enters the right hand shuttle box, as has been previously described. When weaving pile fabric or cloth, with two shutttles operated in parallel, I provide at the right hand side of the ground warp area of the loom, two sets of contact members 97, 101, 104 and 105 connected in series in the same manner as for the use of one shuttle in weaving plain fabric, one set of contact members for each of the two fillings or picks. The two contact springs 97 are both connected to the lead 236 and so spaced vertically that the finger 100 of the upper spring 97 is controlled by the upper pick or filling extending from the right hand side of the upper ground warp and the finger 100 of the lower contact spring 97 is controlled by the lower pick or filling of the lower ground warp. The arrangement of the contact members when operating two shuttles in parallel is shown diagrammatically in Figure 13B, and need not be described here in greater detail.

Pile fabric comprises an upper cloth and a lower cloth, connected by the pile extending therebetween and interwoven therewith. Each of the two cloths has tight ground warps and slack ground warps between which the filling extends. For each cloth there may be two harness frames, the heddles of one frame taking all of he tight warp ends and the heddles of the other frame taking all of the slack warp ends. The harness frames move up and down in alternate relation, for effecting the shedding operation, and remain in either raised or lowered position during the picking or filling operation. The cloth harness frames thus have two positions—an upper position and a lower position. The pile warp ends are led through the heddles of pile harness frames which are actuated in proper sequence and may each have three positions—an upper position, a middle position and a lower position—to which they are moved and in which they are held at predetermined times in accordance with the pattern of the weave. With respect to the cloth harness frames, it should be noted that the sequence of operation thereof may vary in accordance with the pattern of the weave, it being assumed, for simplicity of description, that there are four ground warp or cloth harness frames and that the frames of each pair are raised and lowered in alternate relation. Movement of the harness frames is effected by the harness motion, which will now be described with particular reference to Figures 14 to 24, inclusive. The number of harness frames 76 used may vary considerably, depending upon the particular fabric being woven, but it may be assumed, for purposes of description, that there are eight—four cloth and four pile. The harness frames 76 are mounted as a group face to face in guides 238 carried by uprights 239 (Figures 1 and 14), secured to the sides of the loom frame 50, as is known. The motion for actuating the cloth harness frames will first be considered. It comprises a plurality—four—of vibrator plates 240, one of which is shown more clearly in Figures 17 and 18, pivoted at their lower left corners, on a rod 241 mounted in the lower end of a guide frame 242 fixed to, and extending above and below, cross channel beams 243 of the loom frame 50. A gear 244 (Figure 18) is pivoted, at 245, on vibrator plate 240 at the front and adjacent the upper left hand corner thereof. Gear 244 is provided with two enlarged diametrically opposite locking teeth 246, and with four normal sized teeth to one side of and three normal sized teeth to the other side of each of the locking teeth 246. The gear 244 thus has two groups of eight teeth each, which groups are oppositely related, with respect to the disposition of the normal sized teeth relative to the respective locking teeth 246, and are separated by two spaces respectively provided by the omission of one normal sized tooth.

A locking bar 247 is pivoted adjacent its right end, at 248, on plate 240, below gear 244. Bar 247 is urged upward by a coil compression spring 249 disposed about a rod 250 slidable through an angle strip 251 extending from front to back of guide frame 242, at the lower end thereof. Rod 250 has a rounded head 251ª at its upper end seating in a corresponding recess in the lower edge of bar 247 adjacent its left end, and compression spring 249 is confined between the head 251ª of rod 250 and the upper horizontal flange of angle strip 251. The rods—one for each locking bar 247—fit loosely through angle strip 251, to accommodate rocking of the vibrator plates 240 on their pivot rod 241, as will appear more fully presently. Upward movement of locking bar 247 is limited by a stud 252 secured to vibrator plate 240, so that when bar 247 is in its fully raised position it will be disposed to clear the normal sized teeth of gear 244, but may be contacted and forced downward, in opposition to compression spring 249, by either of the locking teeth 246 of gear 244. The locking bar 247 is provided, at about the midlength of its upper edge, with a notch 253 adapted to receive either one of the locking teeth 246 of gear 244, so as to lock gear 244 in position with the locking teeth 246 thereof disposed vertically.

Gear 244 is connected, by a link 254, pivoted thereto at its lower end on the diameter of the locking teeth 246 and adjacent one thereof, to a slide plate 255. This slide plate 255 is slidably mounted in vertically spaced combs 256 mounted in guide frame 242, each comprising side bars 257 connected by spaced cross strips 258 between which the plates 255 operate. A cross arm 259 is fixed to plate 255 and projects beyond the sides thereof. The ends of cross arm 259 are connected by links 260 to blocks 261 fixed to the inner ends of jack bars 262 pivoted intermediate their ends on rods 263 (Figures 14 and 18) mounted in pairs of uprights 264 and 264ª secured to the cross channel beams 243. The outer ends of jack bars 262 are suitably connected to the end rails of the corresponding harness frame 76, as will be explained more fully presently. From what has been said, it will be clear that when slide plate 255 is raised the harness frame 76 is lowered and vice versa, and that by turning gear 244 through a half revolution the slide plate 255 is either raised or lowered and the harness frame 76 is locked in position during the picking operation.

The vibrator plate 240 is urged toward the right by a tension spring 265 (Figures 14, 15 and 19) anchored to the left edge of plate 240 and, by a stirrup 266, to a rod 267 mounted in the right hand pair of uprights 264. Movement of vibrator plate 240 to the right and to the left is limited by bars 268 and 269 (Figures 17 and 18), and a stop and locking finger 270 secured to the right upper corner of plate 240 and extending upward therefrom between bars 268 and 269. These bars 268 and 269 are secured on mounting strips 269ª bolted to the inner faces of the front and the back uprights of frame 242 and projecting a substantial distance to the right thereof, as viewed from in front. A yoke 271 (Figures 14 to 18) is pivoted at 272 on the guide frame 242 and is urged downward by a coil compression spring 273 (Figure 17) mounted about a rod 274 and confined between a rounded head 274ª at the lower end of rod 274, seating in a corresponding recess in yoke 271, and a plate 275 fixed to bar 257 of the upper comb 256, through which plate rod 274 slides loosely. Downward movement of yoke 271 is limited by the mounting strips 269ª, as will appear more fully presently. The yoke 271 carries a locking blade 277 disposed, when the yoke 271 is lowered, between bars 268 and 269 (Figures 17 and 18). When vibrator plate 240 is to the left, as in Figure 17, locking blade 277 is at the right of finger 270 and, in cooperation with bar 269, locks plate 240 in that position. When vibrator plate 240 is to the right, locking blade 277 is at the left of finger 270 and, in cooperation with bar 268, locks plate 240 in its latter position, as will readily be understood.

Yoke 271 is connected, adjacent its right hand side, by a link 278 (Figures 14, 15 and 17) to the right hand end of a lever 279 pivoted at 280 on the front cross channel beam 243. Lever 279 carries, at its left end, a roller 281 disposed to be contacted by a cam 282 fixed to shaft 283 of a mutilated cylinder gear 284 rotatably mounted between channel beams 243, adjacent the left side of guide frame 242. The mutilated cylinder gear 284 is driven from the middle shaft 170 (Figures 9, 15 and 16), through bevel gearing 285, shaft 286 and bevel gearing 287, at twice the speed of shaft 170, that is, at the speed of the main crank shaft 110, and in counterclockwise direction as viewed from the front of the loom.

The harness motion operating cylinder gear 284 has two groups of teeth 288 and 289—the leading group containing five teeth and the following group containing four teeth—separated by a groove 290 of proper shape and size to receive either of the locking teeth 246 of gear 244 of the vibrator plate 240. The remainder of cylinder gear 284 is without teeth and may be of regular curvature but, preferably, is slabbed off, as shown, so that by turning it into position with its flat presented to the guide frame 242, it will clear the locking teeth 246 of the adjusting gears 244 and the various vibrator plates 240 may then be adjusted manually for adjusting the harness frames 76. When the vibrator plate 240 is to the left, the teeth of cylinder gear 284 mesh with the teeth of gear 244 and turn it through one-half revolution for each complete revolution of cylinder gear 284. That either raises or lowers the corresponding harness frame 76, which is locked in position during the picking operation, the cylinder gear 284 continuing to rotate and at the end of the picking operation again meshing with gear 244 and turning it through a second half revolution so as to reverse the position of the harness frame, for the succeeding shedding and picking operations.

The right hand edge portion of the vibrator plate 240 operates in and is guided by a comb 276 comprising superposed comb bars 291 (Figures 18 and 21 to 24) mounted adjacent and to the right of the guide frame 242, slotted from their left hand edges, at 292, and spaced apart by spacing blocks 293, at their ends. A suitable number of plungers 294 have their flattened stems 295 slidable in sidewise contact between the spacing blocks 293 and between the comb bars 291. Each plunger 294 is provided at its right end with an arcuate head 296 and has its stem 295 of proper width to contact the right hand edge of the corresponding vibrator plate 240 only, with which it is aligned. A pattern or timing chain 297, of known type, is mounted on a star sprocket wheel 298 (Figures 15, 16 and 18) rotatably mounted between channel beams 243 to the right of and adjacent the heads of the plungers 294. The star sprocket wheel 298 is provided at its ends with sprockets which engage the cross rods of chain 297, the teeth of the sprockets being connected by vanes which receive between them the balls of the chain, as is known. A gear 299 is secured on the shaft 300 of star sprocket wheel 298 and meshes with a pinion 301 (Figures 14, 15 and 16) keyed on the rearward end of a stub shaft 302 rotatably mounted on guide frame 242, at the front thereof. An eccentric gear 303, keyed on the forward end of stub shaft 302, meshes with an eccentric gear 304, keyed on the forward end of shaft 283 of cylinder gear 284. The structure comprising the comb bars 291 and the spacing blocks 293 is secured at its rearward end to the rearward channel cross beam 242 (Figure 22) and has its forward end, supported by an angle bracket 291a bolted thereto and to bar 268 (Figure 17), spaced a considerable distance from the forward channel cross beam 242. That provides space for the gear 299 and the pinion 301, as will be clear from Figures 15, 16, 21 and 22.

The pattern chain 297 (Figures 18 and 19) has balls 305 thereon arranged to contact heads 296 of plungers 294 in proper order in accordance with the pattern of the weave. When the cam 282 (Figure 17) contacts roller 281, upon completion of the picking operation, yoke 271 is raised, releasing the vibrator plates 240 and such thereof as are not then held to the left by balls 305 of chain 297 are shifted to the right (Figure 23), and other vibrator plates may be moved to the left (Figure 24) by balls 305 according to the pattern for which chain 297 is adjusted. While cam 282 is in contact with roller 281, the star sprocket wheel 298 is driven at increased speed in counterclockwise direction, as viewed from in front, by the eccentric gears 303 and 304 (Figure 14), properly disposed to that end. That assures quick adjustment of the vibrator plates 240, by balls 305 of chain 297, which adjustment is completed before cam 282 passes out of contact with roller 281. As soon as cam 282 passes out of contact with roller 281, yoke 271 is lowered and the vibrator plates 240 which have been shifted to, or are at, the left are locked in that position, those which have been shifted to, or are at, the right also being locked in position. The star sprocket wheel 298 is then driven at decreasing speed and the cylinder gear 284 functions to shift the harness frames corresponding to the vibrator plates in the left hand position, as previously described.

The description of the harness motion has had to do, so far, with the operation of the vibrator plates for adjusting the ground warp harness frames only, of which there are four—two for each cloth, shown by way of example.

The respective pile harness frames usually have three positions—lower, middle and upper—and are shifted in accordance with the pattern of the weave. Each pile harness motion comprises two vibrator plates 240—a front plate and a back plate—having a gear, locking lever and locking finger, similar to the ground warp vibrator plates. As is shown more clearly in Figures 21 and 22, the vibrator plates 240 of the pile harness motion preferably are somewhat thinner than, but otherwise the same as, those of the ground warp harness motion. Since the pile vibrator plates 240 and the associated gears and locking levers are the same as for the ground warp harness frames, the description thereof need not be repeated here and the same reference numbers will be used for such parts. Referring to Figures 19 to 20C, inclusive, a front slide plate 306 is connected by link 254 to gear 244 of the front pile harness vibrator plate 240. An arm 307 is fixed to the upper end of plate 306, at the back thereof, and projects to the right of that plate. This arm 307 is connected by a link 308 to the right end of a lever 309 pivoted, at its center, at 310, on the front of a central slide plate 311 (Figure 20B). The left hand end of lever 309 is connected by a link 312 to the left hand end of an arm 313 fixed to the upper end of a back slide plate 314 (Figure 20C) and projecting to the left thereof. The plate 314 is connected by a link 254 to the gear 244 of its associated vibrator plate 240, in the same manner as slide plate 306 is connected to the gear 244 of its vibrator plate 240. An arm 315 is fixed to the back of central slide plate 311, projects beyond the sides thereof, and has its ends connected by links 260 to blocks 261 fixed to the inner ends of jack bars 262.

When the pile harness frame 76 is in its middle position, the front slide plate 306 is lowered, the back slide plate 314 is raised, or vice versa, and the lever 309 extends at an inclination between the lower ends of the links 308 and 312, as in Figure 19. The center slide plate 311 is then at its midheight, since pivot 310 of lever 309 is then half way between its highest and lowest positions. In order to shift the pile harness frame 76 to its lower position, assuming the front slide plate 306 to be lowered, the front vibrator plate 240 is shifted to the left, while the back vibrator plate 240 remains at the right, and the gear 244 of the front vibrator plate 240 is turned through half a revolution. That raises the front slide plate 306, thereby raising the right end of lever 309 and moving its pivot 310 upward, and with it the center slide plate 311, raising the inner ends of the jack arms 262 and lowering the harness frame. To raise the harness frame from its middle position, again assuming the front slide plate 306 to be lowered, the back slide plate 314 is lowered, lowering the center slide plate 311 and with it the inner ends of the jack arms 262, thereby raising the harness frame. In order to shift the harness frame from full upper position to full lower position, and vice versa, both of the vibrator plate gears are turned simultaneously through half a revolution with both of the plates 306 and 314 either fully raised or fully lowered. The pile harness frame 76 is effectively locked in all three of its positions by the locking levers 247 and locking teeth 246 of the gears 244, in the same manner as the ground warp harness frames.

Each of the jack bars 262, is provided, at its outer end with a parallel guide rod 316 (Figure 14) mounted in a bracket 317 and an end plate 318, both secured to jack arm 262. Rod 316 slidably receives an attaching nut 319 through which is threaded an adjusting shaft 320, also mounted in bracket 317 and plate 318 and normally locked to the latter by clamping nuts 321. The nut 319 has an upwardly projecting ear 322 to which is pivoted the lower end of a link 323 pivoted at its upper end to a threaded rod 324 passing through angle brackets 325 secured to side rail 326 of harness frame 76. Rod 324 is secured and adjusted by clamping nuts 327 thereon engaging the upper bracket 325. It will be seen that by adjusting rod 324 and nut 319, the throw of harness frame 76 may be adjusted, and its vertical position in either direction, for a given throw, may also be adjusted.

As above explained, when the vibrator plates 240 are shifted to the right, they are clear of the cylinder gear 284. It will be seen, from what has been said, that so long as a vibrator plate 240 remains at the right, the corresponding harness frame 76 remains in the position to which it was moved by vibrator plate 240 immediately prior to shifting of that plate to the right, provided the gear 244 of that plate remains locked in position. The loom is subjected to considerable vibration in use, and there is risk that the locking tooth 246 of gear 244 may be released by vibration and downward movement of locking bar 247. To guard against that, I provide (Figures 18 and 19) a stop bar 328 fixed to the lower one of the combs 291, at the under face thereof. Bar 328 is beveled at its underside and is disposed to engage the similarly beveled upper right hand corner 329 of a locking bar 247 when the corresponding vibrator plate 240 is to the right, as shown in Figure 19. When vibrator plate 240 is shifted to the left, corner 329 of locking bar 247 is withdrawn from beneath stop bar 328, as shown in Figure 18, sufficiently to permit locking bar 247 to be actuated by the locking teeth 246 of gear 244, in the manner previously described. The stop bar 329 positively locks the locking bars 247 of all vibrator plates 240 which have been shifted to the right against downward movement, thereby locking the corresponding harness frames in adjustment, as will be clear.

The whip roll stop motion herein disclosed constitutes the subject matter of my divisional application, Serial No. 762,739, filed July 22, 1947, now U. S. Patent 2,453,145; the lay motion herein disclosed constitutes the subject matter of my divisional application, Serial No. 762,740, filed July 22, 1947, now abandoned; the friction drive herein disclosed constitutes the subject matter of my divisional application, Serial No. 762,741, filed July 22, 1947, now abandoned; and the pile knife motion herein disclosed constitutes the subject matter of my divisional application, Serial No. 762,742, filed July 22, 1947, now abandoned.

It will be understood that changes in detail may be resorted to without departing from the field and scope of my invention, and I intend to include all such variations, as fall within the scope of the appended claims, in this application in which the preferred form only of my invention has been disclosed.

I claim:

1. In a loom, a harness motion comprising a plurality of reciprocatory frames, a mutilated operating cylinder gear normally rotated in one direction at substantially constant speed, means for adjusting said frames comprising slide plates respectively connected to said frames and adjusting gears eccentrically connected to said plates, means comprising a pattern chain for moving said adjusting gears to an operative position for meshing with said operating gear and an inoperative position clear thereof, said adjusting gears respectively having enlarged locking teeth and said operating gear having a flat thereon disposed to clear the locking teeth of said adjusting gears and a groove adapted for reception of said locking teeth, means cooperating with said locking teeth for locking in adjustment the adjusting gears while enabling release by partial rotation thereof of those adjusting gears which are in operative position, and driving connections between said operating gear and said chain effective for driving the latter at accelerated speed when said operating gear is out of mesh with the adjusting gears in operative position and at reduced speed when said operating gear is in mesh with said latter adjusting gears.

2. In a loom, a harness motion comprising a plurality of reciprocatory frames, a mutilated operating cylinder gear normally rotated in one direction at substantially constant speed, means for adjusting said frames comprising slide plates respectively connected to said frames and adjusting gears eccentrically connected to said plates, means comprising a pattern chain for moving said adjusting gears to an operative position for meshing with said operating gear and an inoperative position clear thereof, said adjusting gears respectively having enlarged locking teeth and said operating gear having a flat thereon disposed to clear the locking teeth of said adjusting gears and a groove adapted for reception of said locking teeth, means cooperating with said locking teeth for positively locking in adjustment those adjusting gears which are in inoperative position and locking in adjustment those adjusting gears which are in operative position while enabling release of the latter gears by partial rotation thereof, and driving connections between said operating gear and said chain effective for driving the latter at accelerated speed when said operating gear is out of mesh with the adjusting gears in operative position and at reduced speed when said operating gear is in mesh with said latter adjusting gears.

3. In a loom, a harness motion comprising a plurality of vertically disposed frames mounted for vertical reciprocation, a mutilated operating cylinder gear underlying said frames, a plurality of oscillatory vibrator plates underlying said frames to one side of said gear, adjusting gears rotatably mounted on the respective plates each having two diametrically opposite enlarged locking teeth, said operating gear having a groove adapted for reception of said locking teeth, vertically disposed reciprocatory adjusting plates having operating connection to the respective frames, links pivoted at their upper ends to the respective adjusting plates and at their lower ends to the respective adjusting gears adjacent one of said locking teeth, means comprising a pattern chain for selectively swinging said vibrator plates toward and away from said operating gear to an operative position and an inoperative position with the adjusting gears disposed to mesh with and to clear said operating gear respectively, and means cooperating with said locking teeth for locking said adjusting gears in position with the locking teeth thereof disposed vertically while enabling release by partial rotation thereof of those adjusting gears which are in operative position, said operating gear during each revolution thereof turning the adjusting gears in operative position through one-half of a revolution and thereafter passing out of mesh therewith.

4. In a loom, a harness motion comprising a plurality of vertically disposed frames mounted for vertical reciprocation, a mutilated operating cylinder gear underlying said frames, a plurality of oscillatory vibrator plates underlying said frames to one side of said gear, adjusting gears rotatably mounted on the respective plates each having two diametrically opposite enlarged locking teeth, said operating gear having a groove adapted for reception of said locking teeth, vertically disposed reciprocatory adjusting plates having operating connection to the respective frames, links pivoted at their upper ends to the respective adjusting plates and at their lower ends to the respective adjusting gears adjacent one of said locking teeth, means comprising a pattern chain for selectively swinging said vibrator plates toward and away from said operating gear to an operative position and an inoperative position with the adjusting gears disposed to mesh with and to clear said operating gear respectively, and means cooperating with said locking teeth for locking said adjusting gears in position with the locking teeth thereof disposed vertically while enabling release by partial rotation thereof of those adjusting gears which are in operative position, said operating gear during each revolution thereof turning the adjusting gears in operative position through one-half of a revolution and thereafter passing out of mesh therewith, and means controlled by said operating gear for locking said vibrator plates in adjustment while said operating gear is in mesh with the adjusting gears and releasing said vibrator plates when said operating gear passes out of mesh with said adjusting gears.

5. In a loom, a harness motion comprising a plurality of vertically disposed frames mounted for vertical reciprocation, a mutilated operating cylinder gear underlying said frames, a plurality of oscillatory vibrator plates underlying said frames to one side of said gear, adjusting gears rotatably mounted on the respective plates each having two diametrically opposite enlarged locking teeth, said operating gear having a groove adapted for reception of said locking teeth, vertically disposed reciprocatory adjusting plates having operating connection to the respective frames, links pivoted at their upper ends to the respective adjusting plates and at their lower ends to the respective adjusting gears adjacent one of said locking teeth, means comprising a pattern chain for selectively swinging said vibrator plates toward and away from said operating gear to an operative position and an inoperative position with the adjusting gears disposed to mesh with and to clear said operating gear respectively, means cooperating with said locking teeth for locking said adjusting gears in position with the locking teeth thereof disposed vertically while enabling release by partial rotation thereof of those adjusting gears which are in operative position, said operating gear during each revolution thereof turning the adjusting gears in operative position through one-half of a revolution and thereafter passing out of mesh therewith, means controlled by said operating gear for locking said vibrator plates in adjustment while said operating gear is in mesh with the adjusting gears and releasing said vibrator plates when said operating gear passes out of mesh with said adjusting gears, and driving connections between said operating gear and said pattern chain effective for driving the latter at increased speed when said operating gear is out of mesh with the adjusting gears and at reduced speed when said operating gear is in mesh with the adjusting gears.

6. In a loom, a harness motion comprising a reciprocatory frame, a reciprocatory adjusting plate operatively connected to said frame, a mutilated cylinder operating gear, an oscillatory vibrator plate adjacent one side of said gear, an adjusting gear carried by said vibrator plate below said adjusting plate having two diametrically opposite enlarged locking teeth, said operating gear having a groove adapted to receive said locking teeth, a locking bar pivoted on said vibrator plate underlying said adjusting gear yieldingly urged toward the latter, said bar having in its upper edge a notch for receiving said locking teeth cooperating therewith for holding said adjusting gear in position with said locking teeth disposed substantially vertically, a link pivoted at its upper end to said adjusting plate and at its lower end to said adjusting gear adjacent one of said locking teeth, means operated in timed relation to said operating gear for moving said vibrator plate to an operative position in which said adjusting gear is disposed to mesh with said operating gear and an inoperative position in which said adjusting gear is disposed to clear said operating gear, and means for locking said locking bar against downward movement in the inoperative position of said vibrator plate.

7. In a loom, a harness motion comprising a reciprocatory frame, a reciprocatory adjusting plate operatively connected to said frame, a mutilated cylinder operating gear, an oscillatory vibrator plate adjacent one side of said gear, an adjusting gear carried by said vibrator plate below said adjusting plate, a link pivoted at its upper end to said adjusting plate and at its lower end to said adjusting gear eccentrically thereof, means operated in timed relation to said operating gear for moving said vibrator plate to an operative position in which said adjusting gear is disposed to mesh with said operating gear and an inoperative position in which said adjusting gear is disposed to clear said operating gear, two spaced stop members, said vibrator plate having a stop finger extending between said members and in cooperation therewith limiting swinging movement of said vibrator plate in either direction, a locking blade normally disposed in operative position between said stop members and in cooperation therewith and with said finger locking said vibrator plate in either of its said positions, and means actuated by said operating gear for moving said locking blade clear of said finger when the teeth of said operating gear have cleared said adjusting gear in the operative position thereof.

8. In a loom, a harness motion comprising ground warp frames having an upper position and a lower position and pile frames having an upper position and a lower position and an intermediate position, reciprocatory adjusting plates respectively connected to said frames, a mutilated operating cylinder gear, oscillatory vibrator plates adjacent one side of said gear, there being one vibrator plate for each ground warp frame adjusting plate and two vibrator plates for each pile frame adjusting plate, adjusting gears respectively carried by said vibrator plates, means for selectively swinging said vibrator plates to operative position in which said adjusting gears are disposed to mesh with said operating gear and inoperative position in which said adjusting gears are disposed to clear said operating gear, the latter gear being effective during each revolution thereof for turning through one-half of a revolution the adjusting gears in operative position and then passing out of mesh with such adjusting gears, connections between the respective ground warp frame adjusting plates and the corresponding adjusting gears effective for moving the last mentioned plates from fully raised to fully lowered position and vice versa upon said turning of the last mentioned adjusting gears, and connections between the respective pile frame adjusting plates and the corresponding pairs of adjusting gears effective for moving the last mentioned plates from fully raised to fully lowered position and vice versa upon said turning of both adjusting gears of the respective pairs thereof and to a position midway between fully raised and fully lowered position upon said turning of one only of the adjusting gears of the respective pairs thereof.

9. In a loom, a harness motion comprising a ground warp frame and a pile frame, a reciprocatory adjusting plate having operating connection to said ground warp frame, a reciprocatory adjusting plate having operating connection to said pile frame, a mutilated operating cylinder gear, oscillatory vibrator plates adjacent one side of said gear, there being one vibrator plate for said ground warp frame adjusting plate and two vibrator plates for said pile frame adjusting plate, an adjusting gear carried by each of said vibrator plates, means comprising a pattern chain driven by said gear for selectively swinging said vibrator plates to an operative position with said adjusting gears disposed to mesh with said operating gear and an inoperative position with said adjusting gears disposed to clear said operating gear, the latter gear being effective during one revolution thereof for turning said adjusting gears when in operative position through one-half of a revolution and then passing out of mesh therewith, an eccentric connection between said ground warp frame adjusting plate and its associated gear whereby said turning of the latter is effective for moving the last mentioned plate from an upper position to a lower position and vice versa, and connections between said pile frame adjusting plate and its two associated gears comprising eccentric connections to said two gears respectively whereby the last mentioned plate is moved from an upper position to a lower position and vice versa responsive to said turning of both of said two gears and is moved to a position midway between its said upper and lower positions responsive to said turning of one only of said two gears.

10. In a loom, a harness motion comprising a ground warp frame and a pile frame, two reciprocatory adjusting plates respectively connected to said frames, a mutilated operating cylinder gear, oscillatory vibrator plates adjacent one side of said gear, there being one vibrator plate for said ground warp frame adjusting plate and two vibrator plates for said pile frame adjusting plate, adjusting gears respectively carried by said vibrator plates, means for swinging said vibrator plates to an operative position with said adjusting gears disposed to mesh with said operating gear and an inoperative position with said adjusting gears disposed to clear said operating gear, the latter gear being effective during one revolution thereof for turning said adjusting gears when in operative position through one-half of a revolution and then passing out of mesh therewith, a link connecting said ground warp frame adjusting plate to its associated gear eccentrically thereof, two reciprocatory plates at opposite faces of said pile frame adjusting plate, links connecting said two plates respectively to said adjusting gears on said two vibrator plates eccentrically of said two gears, a lever pivoted between its ends to said pile warp frame adjusting plate, and linkage connections between the arms of said lever and said two reciprocatory plates respectively.

11. In a loom, a harness motion comprising a ground warp frame and a pile frame, two reciprocatory adjusting plates respectively connected to said frames, a mutilated operating cylinder gear, oscillatory vibrator plates adjacent one side of said gear, there being one vibrator plate for said ground warp frame adjusting plate and two vibrator plates for said pile frame adjusting plate, adjusting gears respectively carried by said vibrator plates, means for swinging said vibrator plates to an operative position with said adjusting gears disposed to mesh with said operating gear and an inoperative position with said adjusting gears disposed to clear said operating gear, the latter gear being effective during one revolution thereof for turning said adjusting gears when in operative position through one-half of a revolution and then passing out of mesh therewith, a link connecting said ground warp frame adjusting plate to its associated gear eccentrically thereof, two reciprocatory plates at opposite faces of said pile frame adjusting plate, links connecting said two plates respectively to said adjusting gears on said two vibrator plates eccentrically of said two gears, a lever pivoted at its midlength to said pile warp frame adjusting plate, and linkage connections between the arms of said lever and said two reciprocatory plates respectively.

PAUL MATWEEFF.

REFERENCES CITED

The following references are of record in the file of this patent:

UNITED STATES PATENTS

| Number | Name | Date |
|---|---|---|
| 37,760 | Knowles | Feb. 24, 1863 |
| 405,495 | McGinnis | June 18, 1889 |
| 425,843 | Wright | Apr. 15, 1890 |
| 425,844 | Wright | Apr. 15, 1890 |
| 441,626 | Wright | Nov. 25, 1890 |
| 495,453 | Corcoran | Apr. 11, 1893 |
| 626,149 | Desmarais | May 30, 1899 |
| 645,636 | Alvord | Mar. 20, 1900 |
| 661,264 | Gordon | Nov. 6, 1900 |
| 770,495 | Crompton | Sept. 20, 1904 |
| 1,072,842 | Entwisle | Sept. 9, 1913 |
| 1,301,280 | Lanning | Apr. 22, 1919 |
| 1,634,915 | Roland | July 5, 1927 |
| 1,857,837 | Blackman | May 10, 1932 |
| 2,209,857 | Spencer | July 30, 1940 |
| 2,279,675 | Gutman | Apr. 14, 1942 |
| 2,300,098 | Brooks | Oct. 27, 1942 |
| 2,363,996 | Robb | Nov. 28, 1944 |
| 2,384,357 | Van Heek | Sept. 4, 1945 |